United States Patent
Tuomi et al.

(10) Patent No.: US 7,489,317 B2
(45) Date of Patent: Feb. 10, 2009

(54) METHOD AND APPARATUS FOR ANTI-ALIASING FOR VIDEO APPLICATIONS

(75) Inventors: Mika Henrik Tuomi, Soormarkku (FI); Sami Santeri Tammilehto, Kaarina (FI); Petri Olavi Nordlund, Pori (FI)

(73) Assignee: Bitboys Oy, A Finnish Registered Co, Noormarkku (FI)

( * ) Notice: Subject to any disclaimer, the term of this patent is extended or adjusted under 35 U.S.C. 154(b) by 76 days.

(21) Appl. No.: 10/154,415

(22) Filed: May 23, 2002

(65) Prior Publication Data

US 2003/0095134 A1    May 22, 2003

Related U.S. Application Data

(63) Continuation-in-part of application No. 09/711,859, filed on Nov. 12, 2000, now Pat. No. 7,061,507.

(51) Int. Cl.
G09G 5/36 (2006.01)
G06T 17/00 (2006.01)
G06K 9/40 (2006.01)

(52) U.S. Cl. .............. 345/581; 345/589; 345/428; 345/611; 345/606; 382/266; 382/269

(58) Field of Classification Search .......... 345/581, 345/611–616, 619, 629, 639–641, 589, 421–428, 345/586, 606, 501, 522, 545, 549, 552, 618; 382/254, 266, 269, 274, 300, 305
See application file for complete search history.

(56) References Cited

U.S. PATENT DOCUMENTS

| | | | | |
|---|---|---|---|---|
| 5,369,739 A | * | 11/1994 | Akeley | 345/626 |
| 5,446,836 A | * | 8/1995 | Lentz et al. | 345/441 |
| 5,528,737 A | * | 6/1996 | Sfarti | 345/441 |
| 5,668,940 A | * | 9/1997 | Steiner et al. | 345/592 |
| 5,684,939 A | * | 11/1997 | Foran et al. | 345/612 |
| 5,701,365 A | * | 12/1997 | Harrington et al. | 382/212 |
| 5,742,277 A | * | 4/1998 | Gossett et al. | 345/611 |
| 5,818,456 A | * | 10/1998 | Cosman et al. | 345/614 |
| 5,898,440 A | * | 4/1999 | Tachibana | 345/443 |
| 6,005,584 A | * | 12/1999 | Kitamura et al. | 345/582 |
| 6,057,855 A | * | 5/2000 | Barkans | 345/629 |

(Continued)

OTHER PUBLICATIONS

Antialiasing with Line Samples; Jones, Perry; Mitsubishi Electric Research Laboratory.

(Continued)

*Primary Examiner*—Wesner Sajous
(74) *Attorney, Agent, or Firm*—Howison & Arnott, L.L.P.

(57) ABSTRACT

Antialiasing method and apparatus for video applications. A method for antialiasing a video graphic. A determination is first made as to the relative position of a desired pixel being within the polygon and proximate to the edge of the polygon. Once the relative position is known, then a determination is made as to whether it meets a first predetermined condition or a second predetermined condition. If the relative position meets the first condition, then the color of at least an adjacent pixel is blended with the color of the desired pixel in a predetermined proportion. If the relative position meets the second predetermined condition, then the color of at least an adjacent pixel is blended with the color of the desired pixel in a predetermined proportion.

11 Claims, 17 Drawing Sheets

U.S. PATENT DOCUMENTS

| | | | | |
|---|---|---|---|---|
| 6,072,500 | A * | 6/2000 | Foran et al. | 345/611 |
| 6,330,002 | B1 * | 12/2001 | Yamada | 345/629 |
| 6,359,630 | B1 * | 3/2002 | Morse et al. | 345/620 |
| 6,429,877 | B1 * | 8/2002 | Stroyan | 345/611 |
| 6,433,790 | B1 * | 8/2002 | Taylor et al. | 345/611 |
| 6,469,707 | B1 * | 10/2002 | Voorhies | 345/589 |
| 6,501,483 | B1 * | 12/2002 | Wong et al. | 345/611 |
| 6,734,850 | B2 * | 5/2004 | Deering | 345/419 |
| 2002/0167532 | A1 * | 11/2002 | Stroyan | 345/611 |
| 2003/0007701 | A1 * | 1/2003 | Herf | 382/299 |
| 2003/0164840 | A1 * | 9/2003 | O'Driscoll | 345/611 |
| 2004/0075660 | A1 * | 4/2004 | Liao et al. | 345/441 |
| 2004/0257376 | A1 * | 12/2004 | Liao et al. | 345/587 |

OTHER PUBLICATIONS

Pixel-Planes 5: A Heterogeneous Multiprocessor Graphics System Using Processor-Enhanced Memories; Fuchs, et al.; Computer Graphics, vol. 23, No. 3, Jul. 1989; pp. 79-88.

A Real-Time Antialiasing Technique for Polygonal Scenes; Ladkani, Mann; Daniel Cohen-Or, The School of Computer Science, Tel-Aviv University.

Fast Spheres, Shadows, Textures, Transparencies, and Image Enhancements in Pixel-Planes; Fuchs, et al.; Dept. of Computer Science, University of North Carolina at Chapel Hill; vol. 19, No. 3, 1985, pp. 111-120.

A New Simple and Efficient Antialiasing with Subpixel Masks; Schilling; Computer Graphics, vol. 25, No. 4, Jul. 1991; pp. 133-141.

Triangle Scan Conversion using 2D Homogeneous Coordinates; Olan, University of North Carolina; Greer, Hewlett-Packard.

* cited by examiner

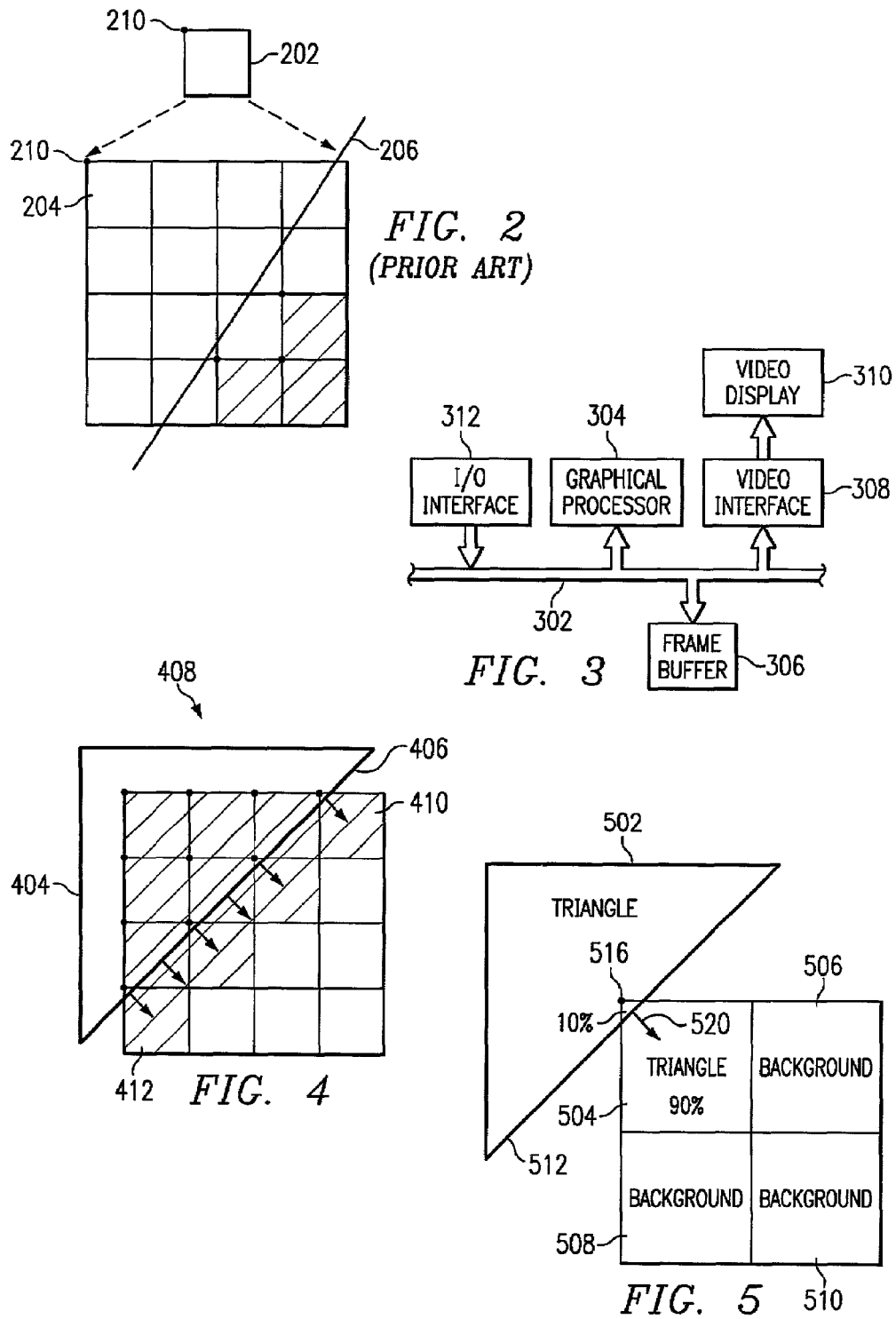

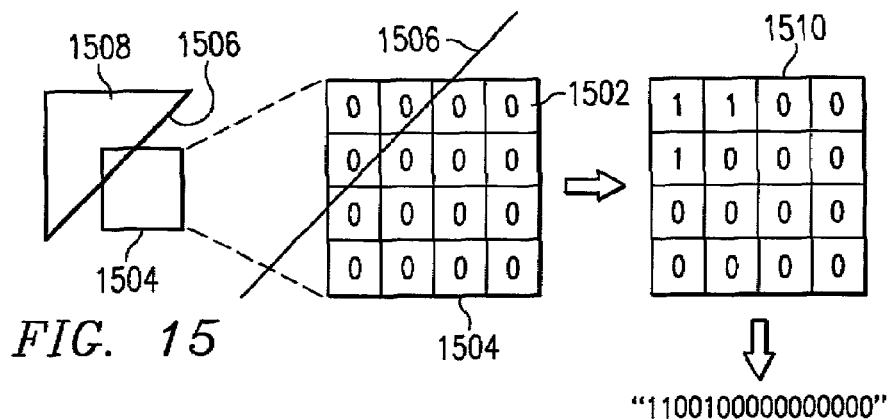
FIG. 15
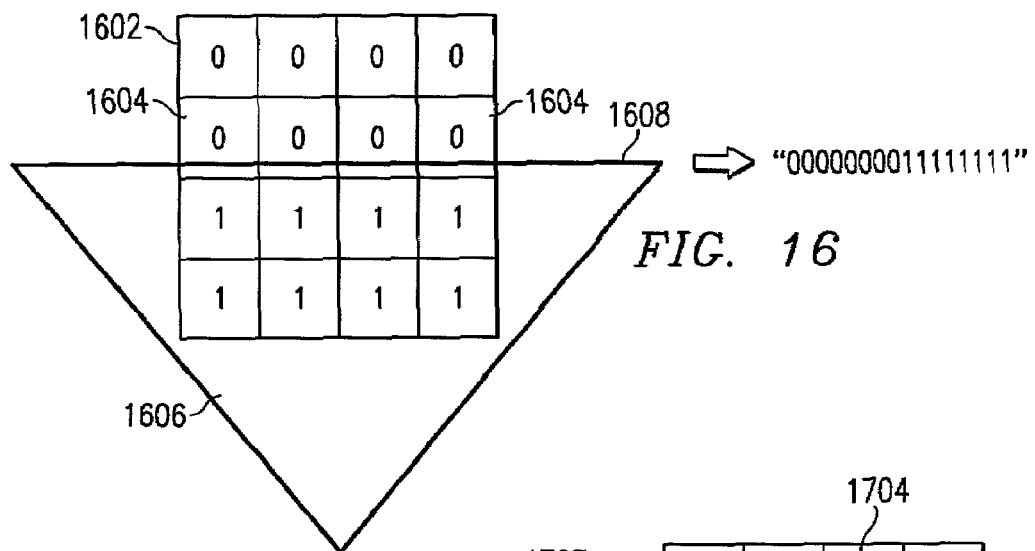
FIG. 16
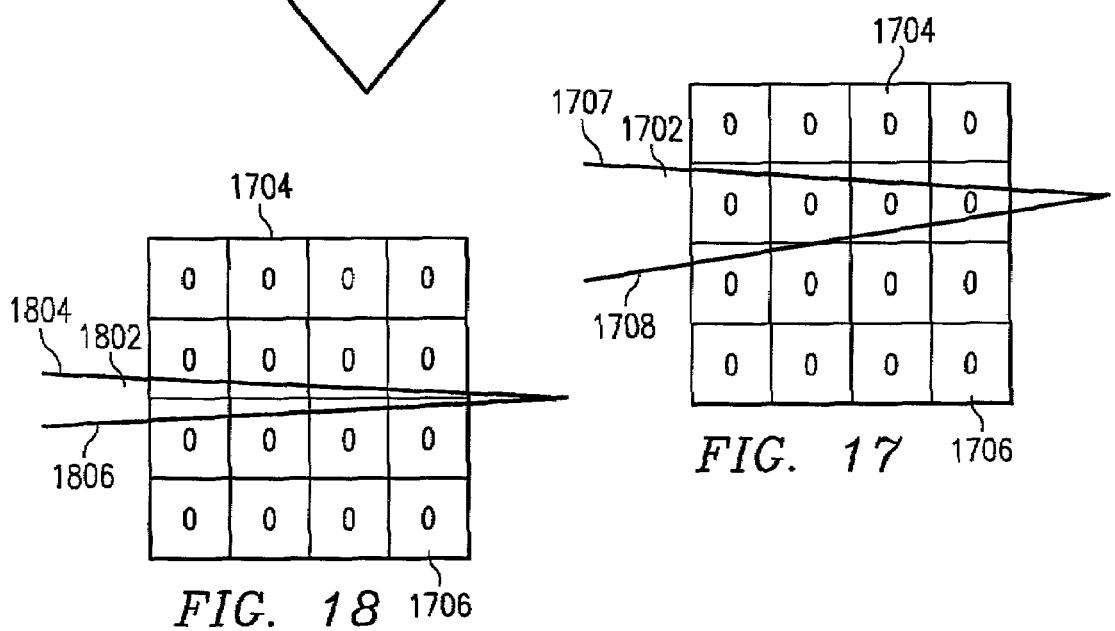
FIG. 17
FIG. 18

MASK= 0000011000100000 (16 BIT) (RED Δ)
$Z_p$ DEPTH OF BACKGROUND (32 BIT)
$Z_s$ DEPTH OF RED TRIANGLE (16 BIT)

MASK= 0000011000100000 (16 BIT) (RED Δ)
$Z_p$ DEPTH OF BLUE TRIANGLE (32 BIT)
$Z_s$ DEPTH OF RED TRIANGLE (16 BIT)

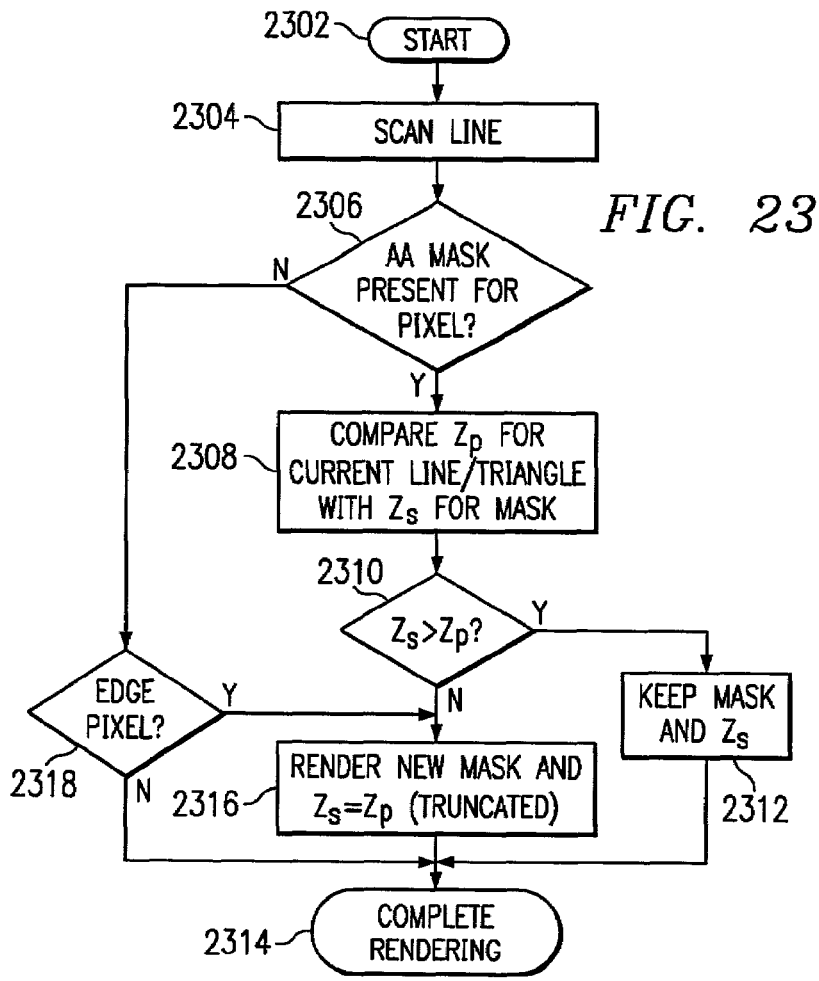
FIG. 23
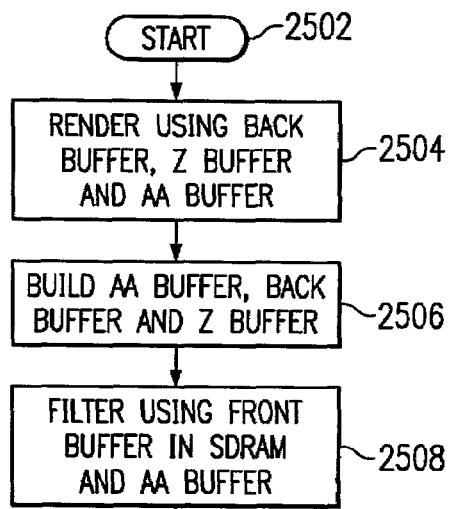
FIG. 24
FIG. 25

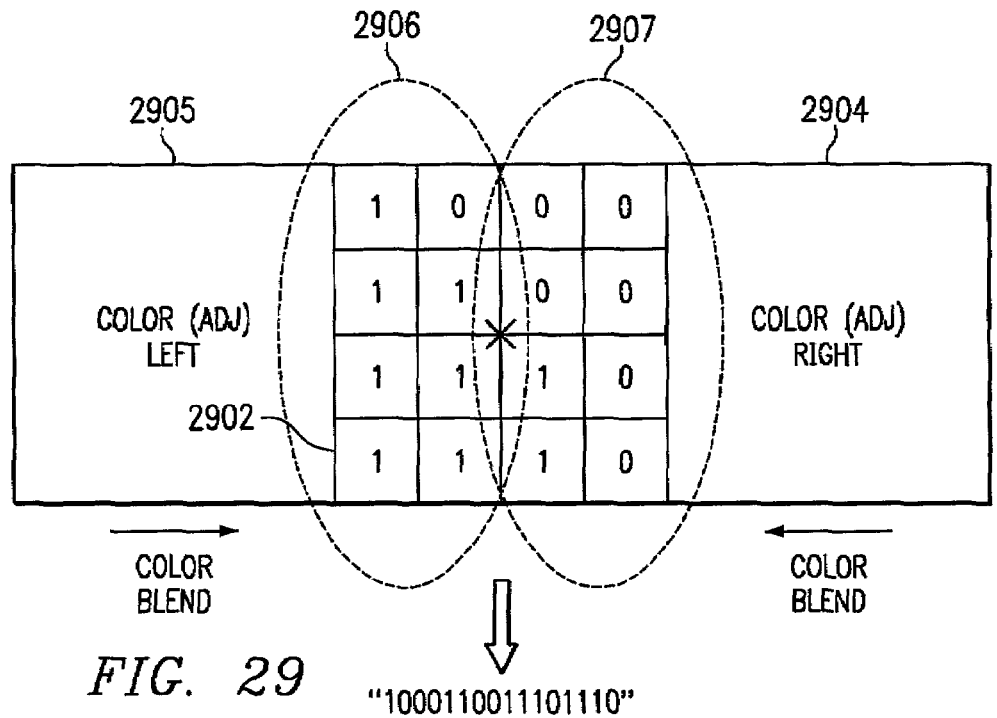
FIG. 29  "1000110011101110"
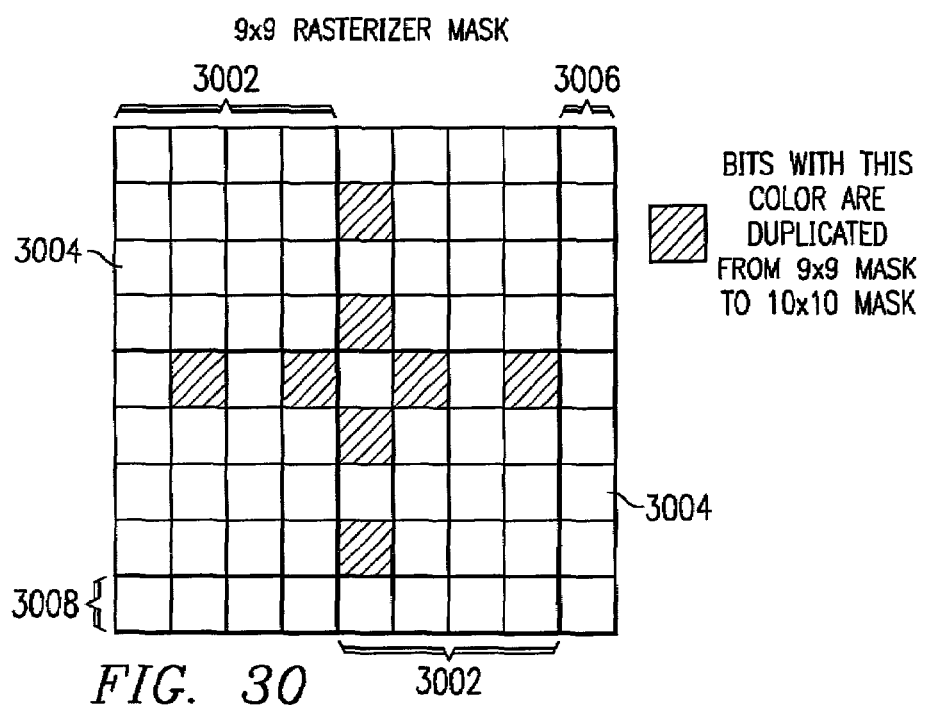
FIG. 30

METHOD AND APPARATUS FOR ANTI-ALIASING FOR VIDEO APPLICATIONS

CROSS REFERENCE TO RELATED APPLICATIONS

This application is a Continuation-in-Part of U.S. patent application Ser. No. 09/711,859, filed Nov. 12, 2000 and entitled "Anti-Aliasing Method and Apparatus for Video Applications," now U.S. Pat. No. 7,061,507, issued on Jun. 13, 2006, which is incorporated herein by reference.

TECHNICAL FIELD OF THE INVENTION

This invention pertains in general to computer graphics, and more particularly, to antialiasing of edge pixels in a rendered graphic.

BACKGROUND OF THE INVENTION

In computer graphics, images are formed by selectively combining a plurality of polygons into a final image that can be displayed on a display output pixel grid. The polygons are received from an input data file and then rasterized into the pixel grid to determine the properties of each pixel in the pixel grid. When a given polygon, a triangle for discussion purposes, is rendered, a determination must be made as to whether a given pixel lies within the boundaries of the triangle. If the pixel is completely contained in the boundary of the triangle, then the color of the triangle will be the color of the pixel. Whenever a pixel lies on an edge of the triangle, or the triangle edge passes therethrough, a decision must be made as to whether the pixel is to be the color of the triangle or the color of the background. The decision is typically based upon a fixed point within the pixel, that being the center point or one of the edge points. Typically, the top left corner vertex of the triangle is utilized as the sampling point. Therefore, if the top left corner (TLC) is within the triangle, then the pixel will be rendered with the color of the triangle. If, however, it is outside of the triangle, no matter how close the TLC is to the triangle edge, then it will be rendered in the background color. The result of this decision making process is a "jagged" edge, referred to as a "jaggie." The reason that these jaggies exist is that the image must be quantized or rasterized to discrete memory locations, such as within a frame buffer, which correspond to the pixel locations in the pixel grid. These jaggies therefore constitute visual artifacts of the images when displayed. This limited resolution is referred to as "aliasing," because visual artifacts are created by differences in the spatial frequency characteristics of the display and the spatial frequency characteristics of the viewer's eyes. Techniques for removing or reducing artifacts by smoothing the appearance of the jaggies and/or increasing the spatial frequency characteristics of the display are known as "antialiasing" techniques.

One function of antialiasing is that referred to as "supersampling." Supersampling is a technique that requires a plurality of samples of the polygon to be taken within the pixel boundaries and then a determination made as to what percentage of these pixels are within the triangle and what percentage are outside of the triangle such that an averaging operation can then be performed as to the color. For example, if the supersampling determines that 80% of the pixel is within the triangle and 20% is outside of the triangle, and that the triangle is green and the background boundary outside the triangle is red, then a "blend" can then be made between the color of the triangle and the background color such that a blend of 80% green and 20% red can be made. This gives a "blurring" effect to the edge of the triangle.

The manner in which this supersampling is carried out is to divide the pixel into "subpixels" and then determine if the TLC of each of the subpixels is inside or outside the triangle. If, for example, the pixel is divided into a 2×2 array with four pixels, and three pixels are determined to have the TLC within the triangle and one pixel determined to have the TLC outside of the triangle, then 75% of the triangle color would be blended with the background color to actually generate this pixel by the video display processing portion of the computer graphics system. However, in order to achieve this supersampling, information regarding the values of the subpixels must be stored in the frame buffer. In the 2×2 example, this would require the color for each of the subpixels to be stored which would result in a frame buffer having a requirement for four times the memory. If an 8-bit value is required for the color value of the pixel, then four 8-bit values would be required for a given pixel. This situation is exacerbated when there are a number of color planes involved with each color having a value from "0" to "256."

SUMMARY OF THE INVENTION

The present invention disclosed and claimed herein, in one aspect thereof, comprises a method for anti-aliasing pixel that are proximate to the edge of a polygon. A determination is first made as to the relative position of a desired pixel being within the polygon and proximate to the edge of the polygon. Once the relative position is known, then a determination is made as to whether it meets a first predetermined condition or a second predetermined condition. If the relative position meets the first condition, then the color of at least an adjacent pixel is blended with the color of the desired pixel in a pre-determined proportion. If the relative position meets the second predetermined condition, then the color of at least an adjacent pixel is blended with the color of the desired pixel in a predetermined proportion.

BRIEF DESCRIPTION OF THE DRAWINGS

For a more complete understanding of the present invention and the advantages thereof, reference is now made to the following description taken in conjunction with the accompanying Drawings in which:

FIG. 2 illustrates an expanded diagrammatic view of a single pixel for a prior art supersampling technique;

FIG. 3 illustrates a block diagram of the graphics computer for rendering the graphics;

FIG. 4 illustrates a diagrammatic view of each of the pixels and their vector representation in accordance with the present disclosure;

FIG. 5 illustrates an expanded diagrammatic view of four pixels and one associated edge pixel;

FIG. 15 illustrates a diagrammatic view of an alternate embodiment;

FIGS. 16, 17 and 18 illustrate further embodiments of the embodiment of FIG. 15;

FIG. 23 illustrates a flow chart for the operation of generating and overwriting the antialiasing mask;

FIG. 24 illustrates a diagrammatic view of the antialiasing mask buffer;

FIG. 25 illustrates a flow chart for the operation of rendering the pixels and then filtering the rendered video information for the rendered data with the antialiasing information;

FIG. 29 illustrates a diagrammatic view of the blending operation for a given pixel;

FIG. 30 illustrates the rasterizer mask for a sparse sampled sub pixel grid embodiment;

DETAILED DESCRIPTION OF THE INVENTION

Figure 1A:
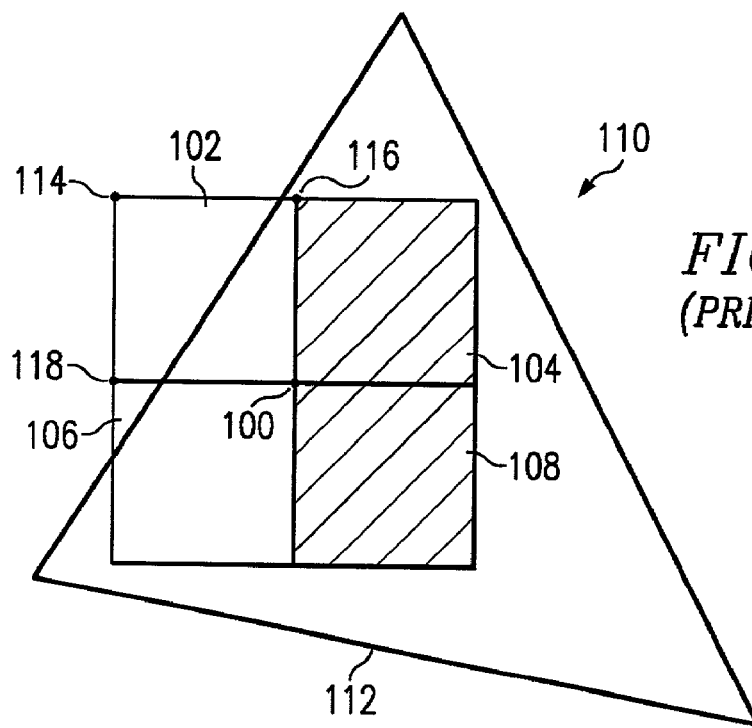
FIGS. 1a and 1b illustrate diagrammatic views of the prior art system, illustrating a difference between normal sampling and supersampling.
Figure 1B:
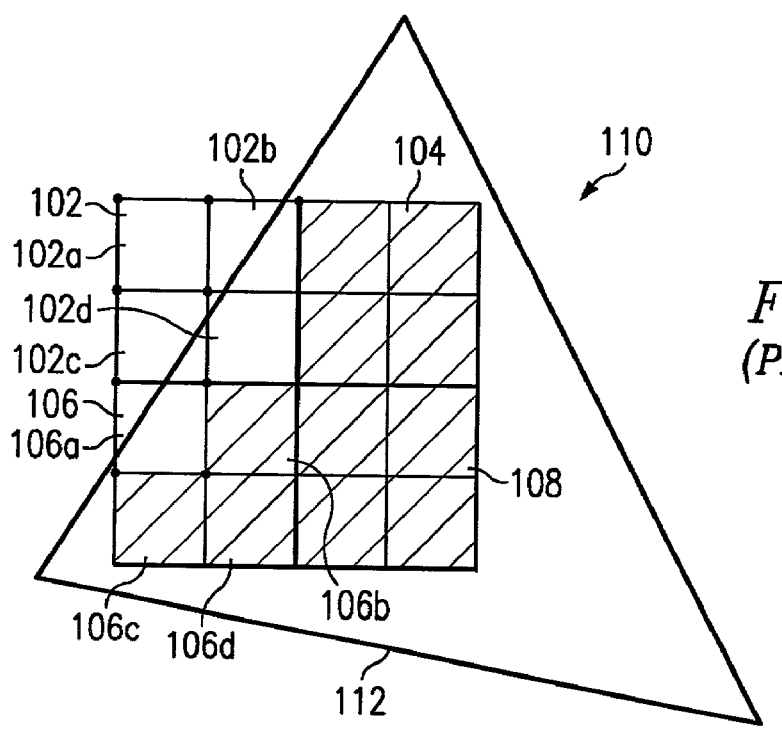

Referring now to FIGS. 1a and 1b, there are illustrated diagrammatic views for a prior art graphics processing system utilizing supersampling. In FIG. 1a, there are illustrated four pixels 102, 104, 106 and 108. There is also illustrated a triangle 110, which triangle 110 has an edge 112 that passes through the grid of pixels 102-108, it being understood that many more pixels would be associated with the grid and adjacent to the pixels 102 and 108. The edge 112 passes through pixel 102 and pixel 106, with pixel 104 and pixel 108 being fully contained within the triangle 110. In a conventional rasterizing operation, the decision will be made as to whether the pixel was within the triangle or outside the triangle. This decision is based upon a point somewhere in the given pixel within the triangle or outside of the triangle. This point is typically selected as the top left corner (TLC) of the pixel. Pixel 102 has a TLC 114, pixel 104 has a TLC 116, pixel 106 has a TLC 118 and pixel 108 has a TLC 120. It can be seen from FIG. 1a that pixel 102 has its associated TLC 114 outside of triangle 110 and pixel 106 has its associated TLC 118 outside of triangle 110. Therefore, both pixel 102 and pixel 106 would have a color associated therewith rasterized and set to equal background color whereas pixels 104 and 108 having their associated TLC's 116 and 120 within the triangle 110 set to the color of the triangle 110. When the video display processing portion of the graphics computer generates the pixels, it will extract from a frame buffer information about the pixels which will indicate that pixels 104 and 108 are to be rendered in the color of the triangle, that being the color associated with the pixel and that pixels 102 and 106 are to be rendered in a background color, i.e. not the color of the triangle. It can therefore be seen that there will be an artifact along the edge 112. This edge 112 is typically referred as the silhouette edge.

With reference to FIG. 1b, there is illustrated the concept of supersampling. Each pixel 102, 104, 106 and 108 is divided into subpixels. For example, pixel 102 is now divided into pixel 102A, 102b, 102c and 102d. In the illustration of FIG. 1b, the TLC of each of the pixels 102a, 102b, 102c and 102d is outside of the triangle 110 and the edge 112. Therefore, all of these pixels would be associated with a background color. However, it can be seen that pixel 106, divided into subpixels 106a, 106b, 106c and 106d, is oriented such that only the TLC of subpixel 106a is outside of the triangle 110. Subpixels 106b, 106c and 106d all have their associated TLC within the triangle 110, therefore rendering these subpixels in the color of the triangle. With supersampling, these values for all the subpixels are stored in the frame buffer for each pixel. Each pixel would therefore have stored subsamples associated therewith in the frame buffer and, when the video processing portion of the graphics computer renders a given pixel, it being understood that only a single pixel can be turned on in the display output, these values for the subsamples must be utilized to generate the final value of the pixel. For example, in pixel 106, there would only be one value for the pixel generated for display but it would be the average between all four subpixels and their stored subsample values. In this example, 75% of the samples are indicated as being the color of the triangle 110 whereas one of the samples was indicated as being the color of the background. Therefore, the video processing section would average the color values for pixels 104—75% of the triangle 110 color with 25% of the background color—and blend these colors together in that proportion to yield a final color. However, it is required that the color values for all four subpixels be stored for each output pixel value, thus increasing the size of the frame buffer.

Referring now to FIG. 2, there is illustrated a diagrammatic view of a higher density subpixel operation. This illustrates a pixel 202 which is expanded into 16 subpixels 204. An edge 206 of a triangle is illustrated as being disposed such that only three of the bottom right pixels in the 16 subpixel array are turned on. It can be seen that this would somewhat reduce the jaggie due to the TLC (reference numeral 210) of the pixel 202 being outside of the edge 206, it being understood that the triangle lies to the right of the edge 206. This pixel 202 would normally be off without any antialiasing and would also be off with 2×2 subsampling. With 4×4 subsampling, three out of 16 pixels would be turned on and therefore, 3/16 of the color of the triangle would be blended with 13/16th of the background color, thus reducing the jaggie effect over the 2×2 super sampling technique.

Referring now to FIG. 3, there is illustrated a diagrammatic view of the graphics computer associated with the present disclosure. A conventional internal bus 302 is provided which interfaces with a graphical processor 304, a frame buffer 306 and a video interface 308. The video interface 308 interfaces with a video display unit 310. The resolution of the video display unit 310 and the way in which it is interfaced with the video interface 308 determines the resolution of the display. This is a predetermined resolution that can be defined by the user to the limit of the hardware. The graphical processor will typically receive through an I/O interface 312 information regarding the various polygons that are to be displayed on the video display 310. A graphical processor will then rasterize this information to determine what color a given pixel will be on the video display 310. Once these pixels are rasterized and stored, the video interface 308 merely needs to pull a pixel value up and then set that value to the appropriate color for the video display 310. However, the video interface 308 also performs the antialiasing function which will perform the various blend operation, depending upon the information that is contained within the frame buffer. If this were subsampling, the video interface 308 would blend the pixels that were the color of the triangle with those associated with the background color. Of course, until the video interface 308 pulls or fetches the pixel value that was rendered, it will not know what the background pixel of the adjacent area is. Therefore, in a conventional prior art operation, a neighboring pixel will need to be examined to determine what the blend operation will require. In the present disclosed embodiment, neighboring pixels are examined to determine blending also.

Referring now to FIG. 4, there is illustrated a diagrammatic view of the technique of the present disclosure. A triangle 404 is provided having an edge 406 that passes through a grid of pixels, there being 16 pixels in a 4×4 grid, for illustrative purposes only, it being understood that this represents a part of a much larger grid. In the grid 408, it can be seen that the edge 406 passes through six of the pixels contained therein, these being pixels 410. Of these pixels 410, three are completely within the triangle and seven pixels are only partially within the triangle 404 with the associated TLC contained fully within the triangle 404. Therefore, these seven edge pixels 410 having the associated TLC contained fully within the triangle 404 will be set to the color of the triangle 404, a conventional rasterization process. The remaining six pixels in the grid 408 will be in the background color. It can be seen that this results in a fairly jagged edge as an artifact of the image.

In association with each of the edge pixels, there is provided therefor a vector value, represented by an arrow 412. Each pixel will have associated therewith this vector which is stored in association with the pixel value, the vector having a direction and a magnitude. As will be described hereinbelow, the direction is positive or negative, i.e., pointed toward the triangle or away from the triangle, and basically perpendicular to the edge. This is stored as either a 3-bit value or a 4-bit value representing either eight different directions or sixteen different directions. There is also stored with the vector 412 a "magnitude" for that vector which represents a supersampling value, as will be described in more detail hereinbelow. When the video interface 308 pulls any one of the pixels 410 associated with the edge from the frame buffer 306, this pixel value can be "blended" with neighboring pixels in accordance with the information contained in the stored vector direction and magnitude.

Referring now to FIG. 5, there is illustrated a diagrammatic view depicting the manner in which the value of the vector 412, the vector associated with an edge pixel is related to the pixels through which the edge of the triangle passes. In FIG. 5, there is illustrated a triangle 502 which is associated with a single edge pixel 504. The pixel 504 is illustrated as being at the top left corner of a 2×2 grid of pixels, there being a pixel 506 at the upper right hand corner, a pixel 508 at the lower left hand corner and a pixel 510 at the lower right hand corner. Pixel 504, through which an edge 512 of a triangle 502 passes, constitutes the edge pixel. Since the TLC of pixel 504, represented by reference numeral 516, is within the triangle 502, the pixel 504 will be rendered at the color of the triangle 502, this being represented by the title "Triangle" within pixel 504. The remaining pixels 506-510 will be rendered at the background color, indicated by the title "Background" within the respective pixels 506-510.

The pixel 504 is indicated as actually being disposed on the edge 512 of the triangle 502 such that only 10% of the pixel 504 is contained within the triangle 502. The other 90% of the pixel 504 is disposed outside of the triangle 502. There is provided a vector 520 perpendicular to the edge 512 and oriented from the TLC 516 outward therefrom and perpendicular to the edge. In this example, it has an orientation of substantially 45 degrees to the right and down. The magnitude of the vector represents that only 10% of the pixel is within the triangle, as being the magnitude of the vector 520.

The direction of the arrow 520 indicates that, since the edge pixel is the color of the triangle and the sum of the pixel on the edge pixel 504 is disposed outside of the triangle, there must be a blending operation with an adjacent background pixel, i.e, it will bring the color of the background into the rendered pixel before output, in a blending operation. As will be described hereinbelow, the direction of the vector 520 indicates which adjacent background pixel is to be selected. In the example of FIG. 5, all three adjacent neighboring pixels 506, 508 and 510 are in the background color. However, there may be situations that will be described hereinbelow, that will necessitate a different operation as to which adjacent pixels are blended into or with the edge pixel.

During the blend operation, the color of the pixel 504 will be blended with the next adjacent background pixel in the direction of the vector 520 (for this example), which in this example, would be background pixel 510. It will be blended such that 10% of the resulting color of the pixel 504, i.e., the triangle color, will be blended with 90% of the background color 510. If, for example, the pixel 504 had a full green value of 256 and the background pixel 510 had a yellow color of 256, the yellow value of the resulting pixel 504 would be set at 90% of the yellow value and 10% of the green value to provide the resulting color. However, it should be understood that any blending percentage could be applied, once the percentages of the edge triangle within the triangle (or polygon) are know, and this disclosed example should not be limiting.

Figure 6:
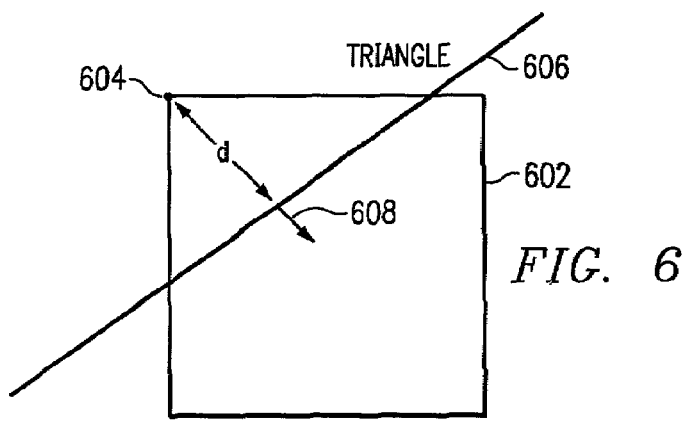
FIG. 6 illustrates a diagrammatic view of the technique for determining the vector value.

Referring now to FIG. 6, there is illustrated a diagrammatic view of the manner in which the magnitude of the vector, in one embodiment, is calculated. A pixel 602 is illustrated having a TLC 604. An edge of a triangle 606 is illustrated, which associated triangle contains the TLC 604. Therefore, the pixel 602 will be initially stored or rendered in the frame buffer in the color of the triangle. A distance measurement is provided between the TLC 604 and the edge 606, which distance measurement represents the percentage that is in the space of the TLC 604, where the percentage outside this space can be calculated therefrom. A vector 608 is provided which is oriented away from the triangle, since this indicates that blending must be with neighboring pixel to that of pixel 602, due to the fact that the pixel 602 is rendered in the color of the triangle. (In this example, the TLC 604 is inside the triangle.) This vector 608 has a direction that is in line with the perpendicular to the edge 606, and in line with the TLC 604 or parallel thereto. To determine which neighboring pixel is to be selected, the direct line from the TLC 604 along the direction of the vector 608 will be taken to the first neighboring pixel. However, it should be understood that many different algorithms could be utilized for blending of neighboring pixels, as will be described hereinbelow.

Figure 7:
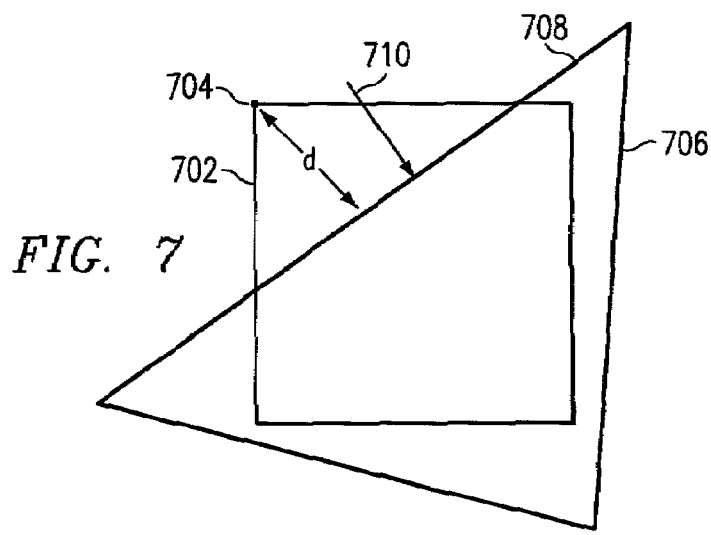
FIG. 7 illustrates an alternate embodiment to the embodiment of FIG. 6.

Referring now to FIG. 7, there is illustrated an alternate embodiment of the embodiment of FIG. 6. In FIG. 7, there is illustrated a pixel 702 having a TLC 704. The TLC 704 is disposed outside of a triangle 706 having an edge 708 that passes through pixel 702. Therefore, there will be a vector 710 associated with the pixel 702 that is directed toward the edge, indicating that the pixel color 702 is that of the background and not of the triangle 706 and that the blending should be from the background to the triangle. The magnitude of the blending operation or the vector 710 is, again, the distance value of the edge 708 from the TLC 704. Although the pixel color is that of the background, the distance represents the portion of the pixel that lies in the background space and also in the direction indicates that it should be blended from the triangle to the background color, the background color being the color of the pixel 702.

Figure 8:
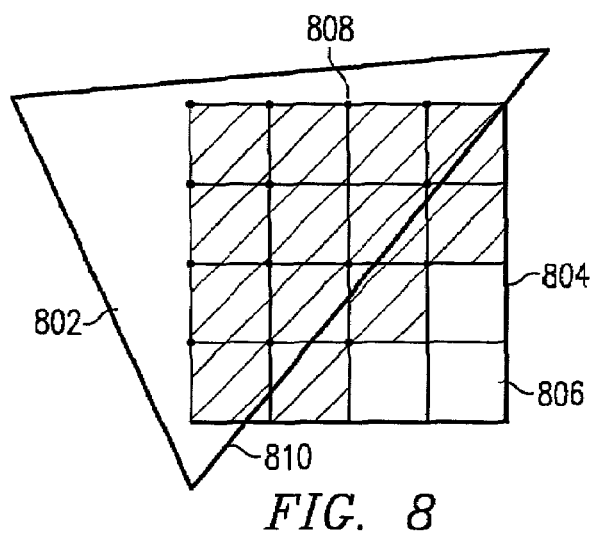
FIG. 8 illustrates a diagrammatic view of the technique for determining the vector value.

Referring now to FIG. 8, there is illustrated a diagrammatic view of the supersampling operation that is utilized to determine the distance. However, it should be understood that many different techniques could be utilized for determining the percentage of the pixel 602 that lies within the triangle or lies outside of the triangle. In the embodiment of FIG. 8, there is illustrated a triangle 802 and a 4×4 grid 804, this grid 804 representing a single pixel, there being a plurality of subpixels 806. The subpixels 806 each have a TLC 808 that constitutes a sampling point to determine if the subpixel lies within the triangle or outside of the triangle. The triangle 802 has an edge 810 that passes through the pixel 804 which intersects a plurality of the subpixels 806. Each of the number of subpixels 806 that are turned on represents the distance value. Also, the particular pixels that are turned on represent the direction. For example, if only the four pixels in the top row were turned on, the direction would be downward and if only four pixels in one column were turned on, the direction would be to the right.

Figure 9:
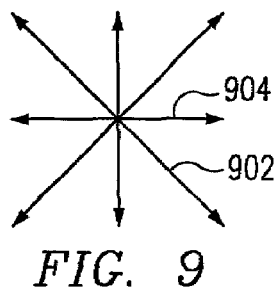
FIG. 9 illustrates a diagrammatic view of the directional aspects of the vector.

Referring now to FIG. 9, there is illustrated a diagrammatic view of various directions that are associated with the vector, this being determined from the supersample grid 804. If the edge 810 of the triangle 802 is disposed at a 45 degree angle, as illustrated in FIG. 8, then the pixel will have a direction 902 at −45 degrees. This is merely represented as the bottom right corner pixel being the background color and the one adjacent to the left and to the top. There could, however, required another direction value between the vector 902 and the vector on the horizontal point to the right, a vector 904 at −22.5 degrees. If an additional vector is required, then additional degrees of freedom will be required for the vector direction. The illustrated diagram of FIG. 9 requires only eight values, requiting a 3-bit value to be stored. However, sixteen values could be provided with a 4-bit stored word. This higher degree of resolution could be provided for the direction of the vector by utilizing more subsamples in the array for each edge pixel 804. Of course, the primary purpose for the direction of the vector, i.e. representing the orientation of edge, is to determine the direction of the neighboring pixel edge to be utilized for the blending operation.

Figure 10:
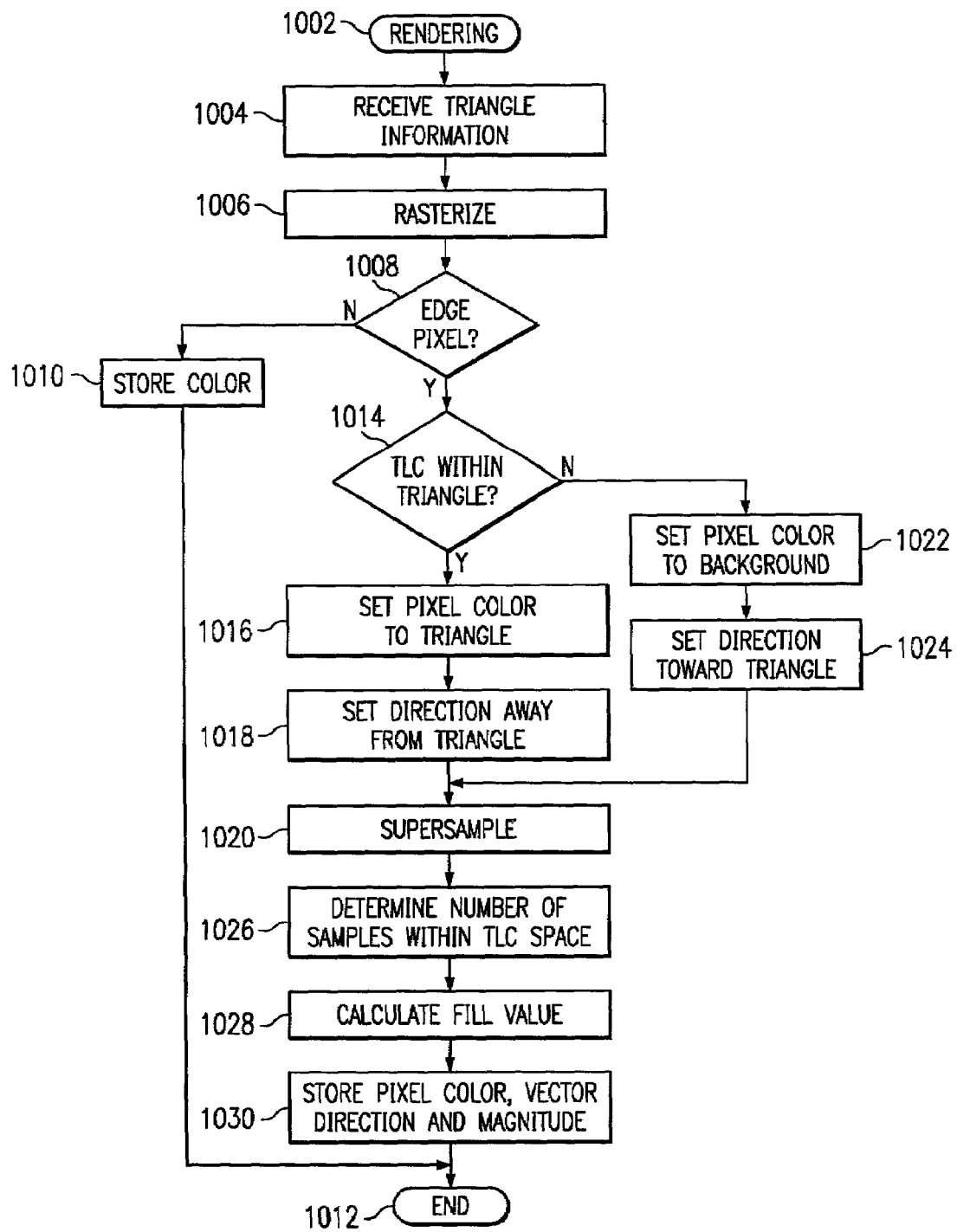
FIG. 10 illustrates a flow chart depicting the rendering operation.

Referring now to FIG. 10, there is illustrated a flow chart depicting the rendering operation for generating the pixel edge to be stored in the frame buffer. The program is initiated at a block 1002 and then proceeds to a function block 1004. Function block 1004 indicates the operation wherein triangle information is received. This is the polygon information that is retrieved from data input file. The program then flows to a function block 1006 to rasterize this information, i.e., it takes all the information and determines the vertices of the edges of all of the pixels to be rendered and their position with respect to all the polygon information. This will allow a determination to be made as to whether the TLC of a pixel to be rendered lies within a polygon such that the color of the polygon can be associated therewith or outside of the polygon, such that it will be a background pixel. This is a conventional process. The program then flows to a decision block 1008 to determine if the pixel is an edge pixel. If not, the program flows along an "N" path to a function block 1010 to store the color and then to End block 1012.

If the pixel is an edge pixel, the program will flow along a "Y" path to a decision block 1014 to determine if the TLC of that edge pixel is within the triangle. If so, this indicates that the pixel should be initially rendered in the color of the triangle and then the program flows along the "Y" path to a function block 1016 to set the pixel color to that of the triangle. The program then flows to a function 1018 to set the direction of the vector away from the edge, i.e., away from the TLC. It is noted that the use of the TLC as the center point will result in the fact that the direction vector cannot be directed outward from the edge for angles between 90 to 180 degrees. After setting direction, the program flows to a function block 1020 to perform a supersample operation.

If the TLC is determined in the decision block 1014 not to be within the triangle, the program will flow along the "N" path to a function block 1022 in order to set the pixel to the color of the background, i.e., indicating that it is not the color of the triangle. The program will then flow to a function block 1024 to set the direction toward the edge of the triangle and the TLC associated with the pixel. Again, the direction toward the triangle will not occupy the directions from 90 degrees to 180 degrees. The program then flows to the supersample function block 1020. At the function block 1020, the supersample operation is performed on the given pixel divided into a plurality of supersamples, there being sixteen in the disclosed embodiment with a 4×4 grid. However, it should be understood that any number of samples could be utilized and, in fact, the sampling need not be performed in a grid manner, although a discrete sampling operation is preferred in digital applications. This supersampling operation allows determination of the number of samples that exist within the triangle, as indicated by a function block 1026. The program then flows to function block 1028 to calculate the fill value for the pixels that are determined to be within the triangle, (it being understood that it is the TLC or sampling point of the subpixels that determines whether it is within the triangle or not). The number of samples determined is that within the TLC space. If the TLC exists in the triangle, then it is the percentage of the pixel within the triangle. However, if the TLC exists outside the triangle, then it is the percentage of the pixel that lies outside of the triangle. This fill value is then utilized as the magnitude of the vector. The program then flows to a function block 1030 to store the pixel color that determines the rasterizing step, the vector direction and the magnitude of the vector, i.e. the fill percentage. The program then flows to the End block 1012.

Figure 11:
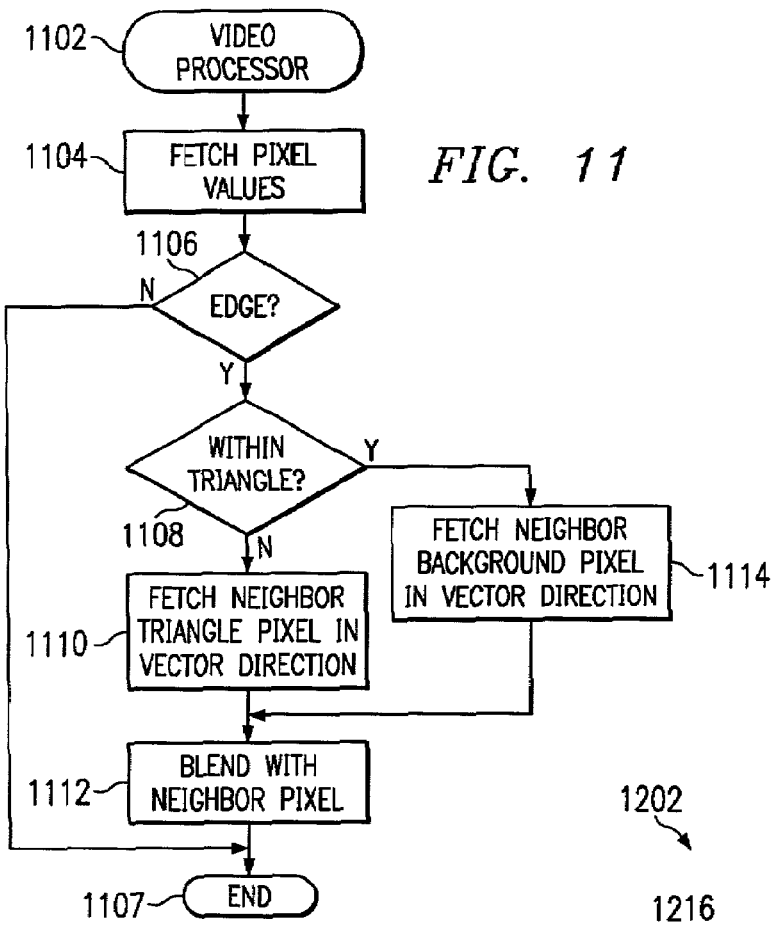
FIG. 11 illustrates a flow chart illustrating the video display process operation.

Referring now to FIG. 11, there is illustrated a flow chart depicting the video processing operation wherein the pixel information in the frame buffer is extracted therefrom and utilized to generate the actual output pixel value. As noted hereinabove, there can only be a single color value for that pixel output. Typically, the pixel device will allow an 8-bit value to be output for the pixel providing for a range of "0" to "256" values of a given color. Additionally, most displays do require multiple color planes to be output, typically a Red, a Green and a Yellow component. Therefore, there will be three 8-bit values for each pixel driven by the video processing operation in that situation.

The flow chart is initiated at a block 1102 and then proceeds to a function block 1104 to fetch the pixel values from the frame buffer, these representing those stored in the form of the rasterized pixel color, the vector direction and the magnitude. It should be understood that this frame buffer only requires the 8-bit color associated with each color level (not subsamples) of the pixel in addition to only a 4-bit magnitude value and a 3-bit or 4-bit value for the direction. Once this information is fetched, the program will flow to a decision block 1106 to determine if this is an edge pixel. This is facilitated by determining if there is any value other than zero in the vector direction or the magnitude. If not, the program will flow along a "N" path to an End block 1107. If, however, the pixel is an edge pixel, the program will flow to a decision block 1108 along a "Y" path to determine if the pixel is within the triangle, i.e., this is determined from the direction information. If not, the program will flow along the "N" path to a function block 1110 to fetch information from a neighboring triangle pixel in the vector direction. The program will then flow to a function block 1112 in order to blend the background information with the neighboring pixel, i.e., the triangle color, as described hereinabove. The program then flows to an End block 1108. If it is determined that the edge pixel has the TLC disposed within the triangle, i.e., the direction of the vector outward from the triangle, then this would indicate that the color is to be blended with the neighboring background pixel, i.e., color from the neighboring background pixel was to be pulled into the given pixel. The program will flow along the "Y" path to a function block 1114 from the decision block 1108 to fetch this color information from the neighboring background pixel. The program then flows to the function block 1112 and then to the End block 1107.

Figure 12:
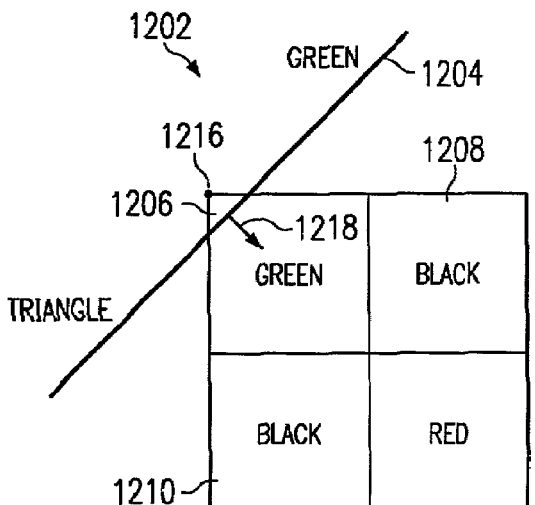
FIG. 12 illustrates a diagrammatic view illustrating a selection of blending with the neighboring pixel.

Referring now to FIG. 12, there is illustrated a diagrammatic view of the blending operation. A triangle 1202 is provided with an edge 1204. The color of the triangle is green. There is provided a grid of four pixels, an upper left pixel 1206, an upper right pixel 1208, a lower left pixel 1210 and a lower right pixel 1214 in a 2×2 grid. The pixel 1206 has a TLC 1216 that is disposed within the triangle 1202. Therefore, this pixel will be rasterized as a green pixel. The pixel 1206 has a vector 1218 associated therewith that is at a direction oriented outward from the edge 1204 of the triangle 1202 and the body of the triangle 1202. The edge 1204 is oriented at a 45 degree angle, for this example. Therefore, it is directed toward the pixel 1214. This is indicated as being a red pixel. The pixels 1208 and 1210 are illustrated as being black pixels.

In one embodiment of the blending operation, the primary pixel that the vector 1218 is directed toward is the pixel that is blended with the color of the pixel 1206. This would therefore result in the pixel 1206 being blended with pixel 1214 in the proportionate ratios of the amount of the pixel 1206 that is within the triangle and the amount that is outside of the triangle. However, when two adjacent pixels are different colors such as pixels 1208 and 1210 being black relative to pixel 1214, this may cause a problem. Therefore, many algorithms could be utilized, for example, if the angle is 45 degrees, 50% of the outside blend could be from the pixel 1214 and 25% from pixel 1210 and 25% from pixel 1208. For example, if 80% of the pixel 1206 were outside of the triangle, then 80% of the blend would be from the neighboring pixels. In this example, 50% of the 80%, 40%, would be obtained from the red pixel 1214, 25% of the 80%, 20%, obtained from the pixel 1208 and the same amount from pixel 1210. This, of course, would require more processing on the part of the video processor in terms of obtaining this information.

Figure 13:
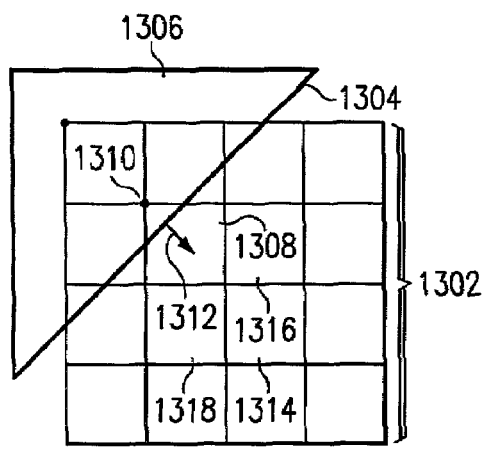
FIG. 13 illustrates a diagrammatic view for blending with multiple neighboring pixels.

Referring now to FIG. 13, there is illustrated an alternate embodiment wherein more than just adjacent pixels are utilized for the blend operation. In FIG. 13 there is illustrated a grid 1302 of sixteen pixels in a 4×4 array, this being part of the entire grid array. This array 1302 has an edge 1304 of a triangle 1306 passing therethrough. There are a number of edge pixels, one being a pixel 1308 having a TLC 1310 associated therewith and disposed within the triangle 1306. The pixel 1308 has a vector 1312 associated therewith that is oriented outward from the triangle, at a 45 degree angle in this example. In this example, there will be a diametrically opposite pixel 1314, similar to the pixel 1214 in FIG. 12. This is the immediately adjacent pixel to which the vector 1312 is pointing. However, the closest neighbors to pixel 1314 that are closest to pixel 1308 adjacent thereto are pixels 1316 and 1318. These are similar to pixels 1208 and 1210 in FIG. 12. However, adjacent thereto and disposed away from edge 1316 in pixel 1308 are other pixels in the array 1302. These are more distantly removed and may be utilized in the blend operation such that a much smaller percentage of their color is "blended" into pixel 1308. In accordance with the percentages of pixel 1308 lying within the triangle and outside the triangle. Again, any type of algorithm could be utilized.

Figure 14:
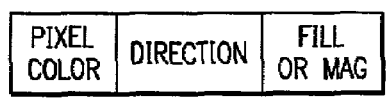
FIG. 14 illustrates a diagrammatic view of the layout of the frame buffer.

Referring now to FIG. 14, there is illustrated a diagrammatic view of the frame buffer layout for the disclosed embodiment. There is provided for each pixel a field for the pixel color, this being an 8-bit field for a given plane or, there could be required multiple planes of color. There is also provided a direction field for the direction of the vector and a fill or magnitude field. The pixel color would be an 8-bit value for each plane (not a subsample), with the direction being a 3-bit or a 4-bit value and the filler magnitude value being typically a 4-bit value. There could also be additional information associated with each of the pixels associated with texture, transparency, and the such. However, it is noted that there are no subsamples associated with the pixels stored in the frame buffer. This significantly reduces the amount of memory required for pixel such that only this information is required for the antialiasing operation.

Referring now to FIG. 15, there is illustrated a diagrammatic view for an alternate embodiment for generating an antialiasing mask. As described hereinabove, the concept of the vector and direction information for the antialiasing operation requires the storage of eight bits to perform the antialiasing operation during the filtering stage on any given pixel. However, this requires the filtering operation to extract the vector, which is a compressed form of the subpixel information or coverage, and then "expand" it to obtain the convolution kernel. For small triangles, this may result in the loss of information.

In the embodiment illustrated in FIG. 15, a mask is generated, comprised of sixteen bits, each bit associated with one of the sixteen subpixels (for a 4×4 array) that are derived during the sampling operation. In this embodiment, there is provided a subpixel mask 1502 for a given pixel 1504. The mask is comprised of sixteen pixels, such that the pixel 1504 is divided up into a 4×4 array. This pixel 1504 is a pixel that is disposed on an edge 1506 of a triangle 1508. When, during the scan operation of the line for the polygon, it is determined that the pixel 1504 is an "edge" pixel, then an antialiasing mask is generated. The purpose, as will be described hereinbelow, is to determine how many of the subpixels fall within the triangle 1508 and how many fall outside of the triangle 1508. The submask 1502 illustrates the sampling points, which are at the center of each of the subpixels in the subpixel mask 1502. This generates a series of values, a "1" when the center point of the subpixel is within the triangle and a "0" when a subpixel is outside of the triangle.

In the example of FIG. 15, it can be seen that there are three subpixels in the upper left corner of the pixel 1504 that are disposed within the triangle 1508. This results in a value of "1" being disposed therein. This is converted to values, as illustrated diagrammatically in an array 1510, which results in the mask value of "1100100000000000."

It can therefore be seen that providing a sixteen bit word wherein each of the bits represents the presence of the associated subpixel within the triangle or outside of the triangle for an edge pixel, that a calculation can be made as to the percentage of pixels that are disposed within the triangle. Thereafter, some type of "blending" operation can be performed during a filtering step wherein the particular pixel that constitutes an edge pixel has the color thereof determined as a ratio of a percentage of the subpixels within the triangle to those outside of the triangle, the blending being between the color of the triangle and the color of the background and also of adjacent pixels, this having been described hereinbelow. This will typically require some type of convolution operation, which will be associated with the color of the triangle within which any portion thereof is disposed.

Referring now to FIG. 16, there is illustrated a diagrammatic view of an edge pixel 1602 illustrating a plurality of subpixels 1604 disposed therein. A triangle 1606 is provided with an edge 1608 running through the pixel 1602. In this illustration, the edge 1608 runs through the pixel 1602 such that one half of the subpixels 1604 have the center sampling point thereof disposed outside of the triangle 1606 and the remaining half, or eight subpixels, have the center sampling point thereof disposed with the triangle 1606. Please note that, while this embodiment utilizes these "centers" of the subpixels as the sampling points, it should be understood that the sampling point can be anywhere within the pixel, at one of the corners, the edge, or any position therein.

Since the pixel in FIG. 16 is so disposed on the edge of the triangle 1606, this will result in the bit value for each of the eight subpixels 1604 outside of the triangle 1606 to be set to a "0." The remaining eight subpixels within the triangle 1606 have the value of the subpixels associated therewith set to a "1." The resulting antialiasing mask value will be a sixteen bit value as follows: "0000000011111111."

Referring now to FIG. 17, there is illustrated an alternate embodiment depicting a very thin triangle 1702 that extends through a pixel 1704 comprised of a plurality of subpixels 1706. The triangle 1702 is disposed such that an edge 1706 and an edge 1708 pass through the pixel 1704 such that only four subpixels are associated therewith, i.e., the sampling point falls within the triangle 1702. This would result in the antialiasing mask having a value of "0000111100000000."

FIG. 18 illustrates an alternate embodiment wherein a triangle 1802 passes through a pixel 1704 with an edge 1804 and an edge 1806 running therethrough but not enclosing any of the center points, sampling points, of any of the subpixels 1706. This will result in a submask value of "0000000000000000."

Figure 19:
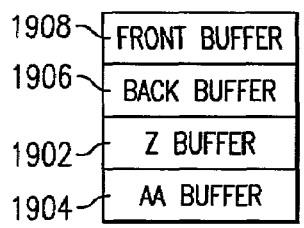
FIG. 19 illustrates the memory layout for the various buffers.

Referring now to FIG. 19, there is illustrated a diagrammatic view of the manner in which the buffers are oriented. There are provided multiple buffers for storing information. There is provided a Z-buffer 1902 for storing the Z-values relating to the depth of the pixel. As is well known in the art, this allows any pixel to have depth information associated therewith such that, during rendering, a triangle having a scan line that is at a lower depth, i.e. nearer the surface, will override the deeper pixel and will provide a replacement therefore. There is provided an antialiasing buffer 1904 for storing the sixteen bit mask and the sixteen bit secondary Z-value indicating depth information for the mask, which secondary Z-value will be described in more detail hereinbelow. In addition, there is provided a back buffer 1906 for storing pixel data during the rendering process for determining the frame information. A front buffer 1908 comprises the information from the previous rendering operation which represents information that is actually displayed. When the rendering operation is complete, the information in the back buffer 1906 is then stored in the front buffer 1908 after filtering with the antialiasing information in the antialiasing buffer 1904.

Figure 20:
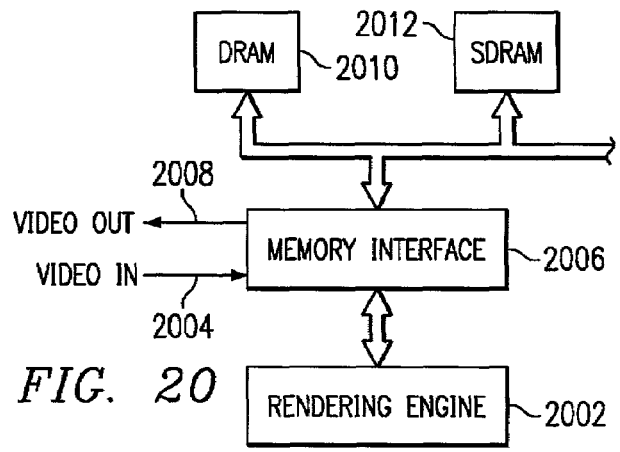
FIG. 20 illustrates an overall diagrammatic view of the rendering engine and the interface to the memory.

Referring now to FIG. 20, there is illustrated a block diagram of the overall 3D engine. The core of the 3D engine is a rendering engine 2002, which is operable to receive video input data on a video input line 2004 which flows through a memory interface 2006 to the rendering engine 2002. The rendering engine 2002 is operable to receive the video input data in the form of various parameters, which parameters are to be converted into video data for output on a video output line 2008. This is a relatively conventional operation for rendering the pixels. The memory interface 2006 is also interfaced with two memories, a DRAM 2010 and an SDRAM 2012. The DRAM 2010 is utilized for storing the back buffer 1906, the Z-buffer 1902 and the antialiasing buffer 1904. The SDRAM 2012 is utilized for storing the front buffer 1908. Therefore, once the back buffer 1906 is created, it will be converted to a front buffer and transferred from the DRAM 2012 to the SDRAM 2012. During the filtering operation, the rendering engine 2002 is utilized in the filtering operation to operate on the SDRAM 2012 in conjunction with the information in the antialiasing buffer 1904 in the DRAM 2010. It is noted that, however, during the filtering operation, only the antialiasing mask is required for the filtering operation.

Figure 21:
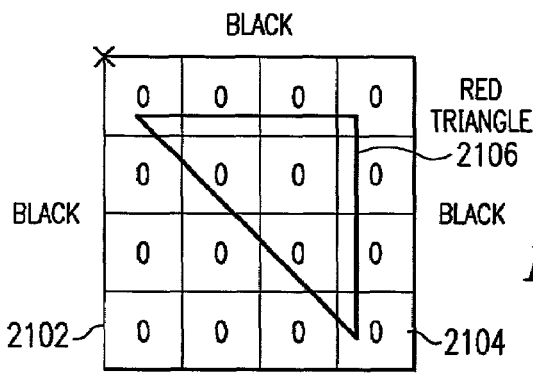
FIG. 21 illustrates a diagrammatic view for generating the depth of a particular antialiasing mask.

Referring now to FIG. 21, there is illustrated a diagrammatic view of a pixel 2102 that is illustrated with a plurality of subpixels 2104 therein. The pixel 2102 has disposed therein a small triangle 2106 which is indicated as being a red color. Therefore, there will be provided a 24 bit color value for this pixel 2106 disposed in the color buffer or back buffer. This is due to the fact that the triangle is within the pixel 2102 and, further, that the sampling point for the pixel is the top left corner "TLC" of the pixel 2102, indicated by an "X." Therefore, the color of the pixel 2102 will be the color of the polygon that occupies the TLC of the main pixel.

The triangle 2106 is disposed such that it only encloses three subpixels 2104 of the main pixel 2102. This particular triangle 2106 has associated therewith a depth value or a Z-value. During the rendering process, the pixel 2102 initially has a Z-value of infinity, due to the background being black. This is represented by the primary Z value $Z_P$, which is a 32-bit value. Essentially, this is represented by all the bits being in a logical "1." After rendering, the depth value or the Z-value of the pixel 2102 will change, depending upon what polygon, a triangle in the present embodiment, has the center sampling point of the pixel 2102 enclosed therein. Therefore, the primary depth information, $Z_P$, of the pixel 2102 will change to Z-value of the polygon. Additionally, during the rendering process, the number of subpixels that have the sampling point thereof disposed within the triangle 2406 will be determined so as to generate the antialiasing mask. This mask is indicated as being the value "0000011000100000." A further measurement provided is a secondary Z-value, $Z_S$. This indicates the depth of the mask, which is determined from the triangle associated with that mask. For example, if the sampling point or center point of the overall main pixel 2102 were enclosed within the triangle, the color of the pixel 2102 would be the same as the triangle and the depth of the mask would be that of the triangle. It is noted that this $Z_S$ value is a 16-bit value, i.e., it is truncated from the 32-bit value associated with the triangle. This allows a 16-bit value to be stored in association with the 16-bit mask to provide a 32-bit overall antialiasing word. In another example, the pixel 2102 could be an edge pixel wherein the sampling point is outside of the triangle, such that the color of the pixel 2102 would be the color of the background but the depth of the mask would be that of the triangle.

The purpose for the $Z_S$ value is to ensure that there is only one mask value for each pixel, that being the mask value associated with the triangle that is nearest to the display. If, during rendering, it were determined that another triangle occupied all or a portion of the pixel 2402, the antialiasing mask for the pixel 2402 would be that associated with the one of the triangles which occupies at least one subpixel and that is nearest to the foreground, even if the center sampling point of the overall main pixel 2402 is outside of the nearest triangle.

Figure 22:
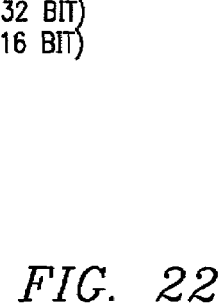
FIG. 22 illustrates a diagrammatic view illustrating the overwriting operation for the antialiasing mask.

Referring now to FIG. 22, there is illustrated an example of a deeper triangle that occupies a portion of the main pixel 2102. In this example, there is provided a triangle that is blue in color, the triangle 2106 being red in color and the background back in color, which larger triangle has an edge 2202 with the interior of the triangle indicated by arrows extending away therefrom. The larger triangle associated with the edge 2202 is disposed such that the main pixel 2102 is an edge pixel, i.e., only a portion of the subpixels 2104 disposed within the larger triangle, the blue triangle. However, the main Z-value for the large triangle is larger than that of the small triangle 2106, i.e., it is further away from the foreground. If the Z-value for the red triangle 2106 were 100 and the Z-value for the large blue triangle were 200, then it would indicate that the triangle 2106 were in the foreground. Therefore, when determining the main Z-value for the pixel 2102, the $Z_P$ value, it is necessary to determine which polygon the sampling point, the "X," point, is disposed in. In this example of FIG. 22, the sampling point is disposed within the blue triangle. Therefore, the Z-value for the pixel 2102 will be set to the color of the blue triangle and that leaves the decision as to what the antialiasing mask value should be. To determine this, the depth value for the blue triangle is compared to that of the $Z_S$ value and the antialiasing buffer. If it is determined that the red triangle 2106 has a smaller Z value, associated with the $Z_S$ value, then the mask will remain unchanged. However, if the blue triangle is nearer to the foreground, then the mask will be overwritten with the value correlating to the number of pixels having the sampling point thereof disposed within the blue triangle. This $Z_S$ value is therefore utilized to resolve a coverage mask ordering problem for pixels that are partially covered. Although the pixel 2102 is illustrated as having the sampling point thereof disposed within the blue triangle, it could be that the blue triangle in fact partially covered the pixel 2102 but did not include the sampling point. Even in this situation, the $Z_P$ of the pixel 2102 would be that of the background for some other color and would remain so. However, the mask value would be determined as that of the nearest triangle or polygon containing at least one subpixel (noting that a rule may be provided that more than one subpixel would be required for the triangle to have priority. Although the $Z_S$ value is only a 16-bit value resulting is some loss of resolution in the decision process as to priority, this is a small tradeoff for the benefits provided as to mask ordering. Therefore, in the filtering or blending step, the color of the main pixel would be blended into neighboring pixels, depending upon the color values thereof and the mask values thereof. The values indicated for the mask indicate that the mask value has not changed, but that the $Z_P$-value has changed to the depth of the blue triangle, whereas the mask depth remains as that of the depth of the red triangle, i.e., the $Z_S$ has not changed from one to the other, nor has the mask value changed, due to the fact that the triangle 2106 is nearer to the surface than the blue triangle.

Referring to FIG. 23, there is illustrated a flow chart depicting the operation of determining the mask overwrite (or non overwrite) during the rendering process. This operation is initiated at a start block 2302 and then proceeds to a block 2304 wherein a line will be scanned, this being the line 2202. As the line is scanned through the pixel 2102, that being the line 2202, a decision is made as to whether an antialiasing mask is present, as indicated by a decision block 2306. If one is already present, the program will flow along a "Y" path to compare the $Z_P$ for the triangle associated with the current line-triangle with the existing antialiasing mask. The program will then flow to a decision block 2310 to determine if the $Z_S$ value is greater than the $Z_P$ value. If so, then the program will flow along the "Y" path to keep the current mask and then flow to a block 2314 to the rendering operation. However, if it was determined that the $Z_P$ for the polygon associated with the line being scanned were greater than the existing mask value in the antialiasing buffer and then the program will flow along the "N" path to a function block 2316 to render a new antialiasing mask, that associated with the percentage of subpixels 2104 that are enclosed by the new polygon, and then set the value of $Z_S=Z_P$ for that current polygon, it being noted that this is a truncation operation wherein the original 32-bit value for $Z_P$ for the current triangle being scanned is truncated down to 16-bits and stored in the antialiasing buffer. The program will then flow to the block 2314 for completion of the rendering process. The completion of the rendering process determines the overall Z-value for the pixel and the color therefore and stores them in the appropriate places.

If, at the decision block 2306, it were determined that no antialiasing mask were present, the program would flow along the "N" path to determine if this is an edge pixel at a decision block 2318. If it were an edge pixel, the program would flow along the "Y" path to the function block 2316 to render a new mask and set the value equal to that of the truncated value. If this were determined not to be an edge pixel, the program will flow along the "N" path to the function block 2314. This would be a default operation wherein the mask would, of course, have all of the pixels and subpixels set to a "1" and the value set equal to the truncated value.

Referring now to FIG. 24, there is illustrated a diagrammatic view of one storage region in the antialiasing mask buffer. This is comprised of two fields, one for the mask, a 16-bit field in this embodiment, and one for the 16-bit value. In another embodiment described hereinbelow, the mask is a 12-bit value.

Referring now to FIG. 25, there is illustrated a flow chart depicting a filtering operation. The operation is initiated at a block 2502 and then proceeds to a function block 2504 wherein the rendering operation is performed utilizing the back buffer, the Z buffer and the antialiasing buffer. As lines are scanned, the back buffer is filled in with the color value for the designated pixel, i.e., the pixel being rendered, the Z value for the rendered pixel is determined, that being Z value for the polygon that within which the sampling point of the rendered pixel resides and, if a determination is made that it is an edge pixel, then the mask value is determined. This is indicated by a function block 2506 wherein the antialiasing buffer, the back buffer and the Z buffer are filled. After completion of the rendering operation, then the back buffer must be transferred to the front buffer. In this operation, as indicated by function block 2508, the filtering operation performs a convolution operation wherein a 3×3 convolution kernel is utilized. This is comprised of a 3×3 array of pixels with a center pixel being the current pixel evaluated. By utilizing the antialiasing mask, and not the $Z_S$-value, the standard convolution process can be utilized to "blend" the current pixel with its neighboring pixels.

Figure 26:
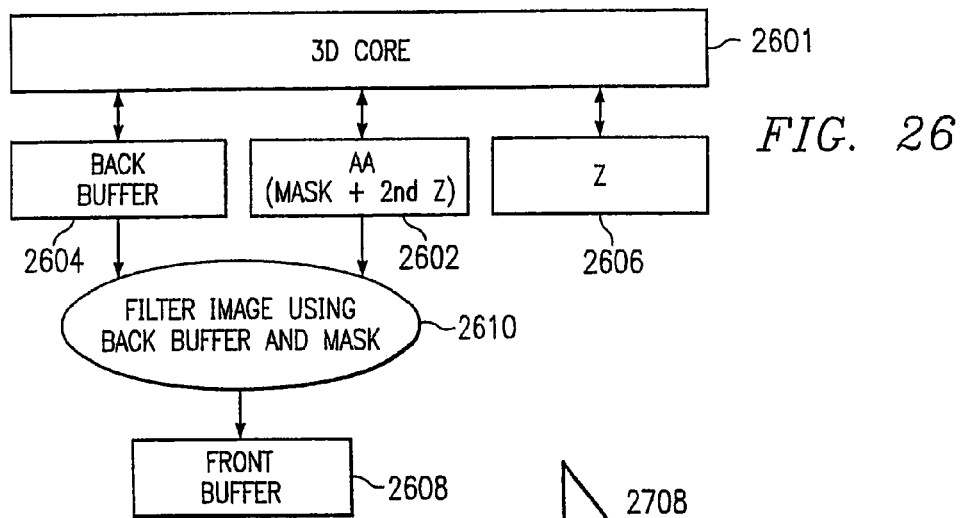
FIG. 26 illustrates a diagrammatic view of the filtering process.

Referring now to FIG. 26, there is illustrated a diagrammatic view of the filtering operation. There is illustrated the 3-D rendering engine core by reference numeral 2602. The 3-D core 2601 is operable to interface with a back buffer 2601 during the rendering operation to create the rasterized pixel. As described hereinabove, each pixel will have associated therewith a depth value and a color value, this color value comprised of the Red, Blue and Green color values. In addition to information in the back buffer 2604, there will also be provided an antialiasing (AA) buffer 2602 which is created during the rendering process. As described hereinabove, this AA buffer 2602 contains the antialiasing (AA) mask and also the secondary Z value, this secondary Z value representing the depth of the antialiasing mask for pixels that are partially covered by a polygon or triangle in the disclosed embodiment, but are not considered inside the triangle, i.e., the sampling point is outside of the triangle. There is also provided a main Z-buffer 2606 which stores the Z values for the primary pixels.

The following sequence of instructions illustrates the operation:

```
//mask = 12bit subpixel mask of incoming pixel
//inside = The center of this pixel is inside the triangle
//flatcase = Triangle considered a 2D overlay; combine fragments to avoid
holes in overlay
//enableflatcase = driver can disable flatcase
int writepixel(int x,int y,int mask, int c,float z,int inside)
{
    if zcompare(z,primaryZ) return(0);
    //Normal color and z write
    if (inside)
    {
        do_standard_color&Z_write(c,z);
        mask=not mask;      //invert mask
    }
    //NOTE: if incoming mask WAS full, it is here
```

-continued

```
//empty because full mask is always inside !!!!
//If pixel is inside, the mask was inverted above.
//The remaining code is needed to run only if
//antialiasing is on
//Read AA buffer if antialiasing is on
if (antialiasing on)
    AA=read from AA buffer;
else
    AA=empty;
if (mask is empty)
{
    if ( zcompare(z,AA.secondaryZ) passes and (c.alpha>treshold))
    {
        AA.mask=0;
        AA.secondaryZ=z;
    }
}else
{
    if (flatcase and enableflatcase) //Driver may force the flatcase off
    {
        //Check if old and new masks cover the pixel 100%
        if ((AA.mask xor mask) is empty)
        {
        AA.mask=0;
            AA.secondaryZ=z;
        }else //If not,force new mask to buffer
        {
            AA.mask=mask;
            AA.secondaryZ=z;
        }
    }else
        if (mask has more "1" bits than AA.mask)
        {
            AA.mask=mask;
            AA.secondaryZ=z;
        }
}
//If antialiasing is on, write possibly modified
//mask and secondary Z back to AA buffer
if (antialiasing on)
{
    write AA.mask to AAbuffer;
    if (secondaryzwrite enabled) write AA.secondaryZ to AAbuffer
}
}
```

During the filtering operation and the building of a front buffer 2608, the primary pixel information in the back buffer 2604 and the antialiasing information in the AA buffer 2602 are utilized. This information is processed through a filtering block 2610, which block 2610 represents a process. The depth information in the Z-buffer 2606 is primarily used during the rendering process to determine which pixel is in the foreground.

Figure 27:
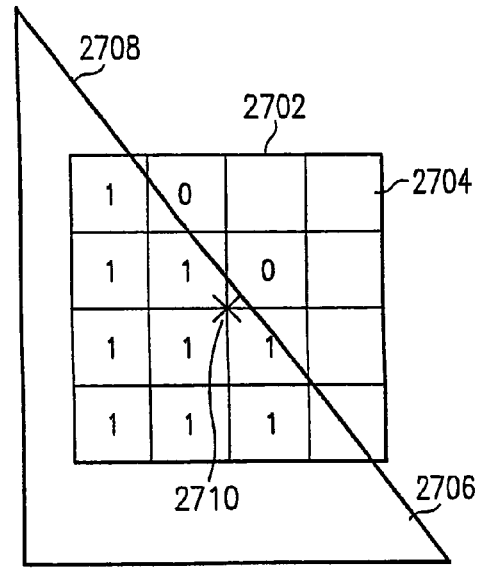
FIG. 27 and FIG. 28 illustrate diagrams of setting the values of the antialiasing.

Referring now to FIG. 27, there is illustrated a view of an edge pixel 2702 representing the subpixel mask, the subpixel mask is comprised of 16 subpixels 2704 arranged in a 4×4 array. A triangle 2706 is provided with an edge 2708 passing through the primary pixel 2702. There is provided a sampling point 2710 in the center of the primary pixel 2702. This sampling point, as described hereinabove, represents the determining point for the primary color of the pixel, i.e., if the center point 2710 of the primary pixel 2702 is within the triangle 2706, then the color of the primary pixel 2702 is the color of the triangle 2706. When this occurs, the value of subpixels within the triangle are set to a value of "1," indicating that these are the subpixels within the triangle associated with the color of the primary pixel 2702.

Figure 28:
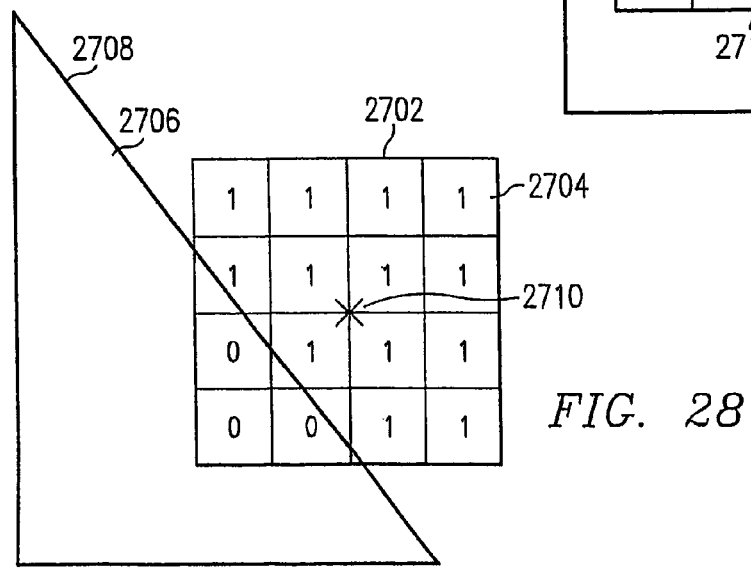

In the alternate condition wherein the center 2710 of the primary pixel 2702 lies outside of the triangle 2706, such that the line 2708 passes through a smaller number of subpixels 2704, this illustrated in FIG. 28, the subpixels that lie within the triangle are set to a value of "0." The remaining subpixels 2704 are set to a value of "1." The value of "1" represents that these are the subpixels 2704 that are associated with space corresponding to the color of the primary pixel 2702. Initially, the sub-mask of subpixels 2704 is cleared to the value of "1" indicating that all of the subpixels are at the color of the primary pixel 2702, which is typically black, the primary background color. During rendering, select one of the subpixels 2704 are set to a value of "0" when determined that the sampling point thereof lies within a space of a different color. If the primary pixel lies mostly outside of the triangle (sampling point outside—center sampling point in this embodiment) and is the color of the background, the subpixels lying inside the triangle will have a "0" value and, if the primary pixel lies mostly inside of the triangle and is the color of the triangle, the subpixels lying outside of the triangle will have a "0" value. Initially, during the rendering process, the AA mask is created by setting the bit associated with the subpixels determined to lie within a triangle to a value of "1," regardless of how much of the primary pixel lies within the triangle. After creation of the AA mask, and before storage thereof in the AA mask, a determination is made as to whether the sampling point of the primary pixel is within the triangle or not. If outside of the triangle, then the bits n the AA mask are "flipped" and the color of the primary pixel set to the color of the space occupied by the sampling point of the primary pixel, the center thereof in this embodiment. As such, the value of "1" for a subpixel always indicates that it has a color associated with the color of the associated primary pixel. This will be utilized for the filtering process, as will be described hereinbelow.

Referring now to FIG. 29, there is illustrated a simplified schematic of the color blending operation or filtering operation for one adjacent pixel to a center pixel 2902. The center pixel 2902 is the pixel that is being processed during the filtering operation. In this process, it can be seen that the mask value for the pixel 2902 is "1000110011101110." There is provided a right adjacent pixel 2904 and a left adjacent pixel 2905 that are utilized in the filtering operation with color blended into the center pixel 2902 from the adjacent pixels 2904 and 2905. As will be described hereinbelow, other adjacent pixels may be utilized, but only two are discussed in this example. The weight of the final color of center pixel is set to the number of subpixels with a value of "1" multiplied by the color of pixel 2902 to provide a center result. When determining the weight of the adjacent pixels 2904 and 2905, the subpixels in primary pixel 2902 are evaluated that are in proximity thereto. In this example, the subpixel array is divided into two regions, a region 2906 comprised of the eight leftmost subpixels and a region 2907 associated with the eight rightmost subpixels. Region 2906 is used for blending the pixel 2905 and region 2907 is utilized for blending of the pixel 2904. In this example, the number of subpixels in the region 2906 having a "1" value are multiplied by the color of the pixel 2905 and a left result generated. Similarly, the number of subpixels in the region 2907 having a "1" value are multiplied by the color of the pixel 2904 and a right result generated. The right, left and center results are then added together and divided by 16 to provide a normalized result. As such, only a single value is required to determine how to blend color from adjacent pixels, due to the fact that the single value has not only percentage information associated therewith, but also directional information. This was also the case with the vector embodiment described hereinabove.

Referring now to FIG. 30, there is illustrated another embodiment wherein sparse sampling is utilized. As described hereinabove, the AA mask is comprised of a 4×4 array. If all of the subpixels are represented in the final mask value, this would result in 16 bits. In this embodiment, there will be defined a 5×5 array that is sparse sampled, i.e., a sparse sampled subpixel grid. These samples will be distributed in a "checkerboard" fashion, providing 12 subpixels, requiring only a 12-bit word for the AA mask. Further, the subpixels are initially rasterized as 4×4 array and then, with an overlapping technique, mapped into a 5×5 array.

In FIG. 30, there is illustrated a 9×9 rasterizer mask illustrated in a plurality of primary pixels 3002 in a 2×2 array, each comprised of 16 subpixels 3004. The 4×4 array of subpixels 3004 for each primary pixel 3002 are arranged in an 4×4 array, in a sparse sampled manner that resembles a checkerboard pattern. Therefore, the top left corner subpixel 3004 will be unsampled and the next adjacent pixel in the row will be sampled, the next one unsampled and the next one sampled. In the next row, the first subpixel 3004 will be sampled, the next unsampled, the next sampled and the last unsampled. This will continue in a checkerboard manner. In the next adjacent primary pixel 3002 to the right, the sampling is the same. The rasterizer mask of FIG. 30 comprises four primary pixels 3002 in a 2×2 array with an adjacent column 3006 of subpixels included from the rightmost primary pixels 3002 and a row 3008 adjacent to the lowermost primary pixels 3002.

In the rendering process, it can be seen that the upper right primary pixel 3002 has the two leftmost sampled subpixels 3004 indicated as being covered by a polygon. The upper left primary pixel 3002 has no subpixels 3004 covered. The lower left primary pixel 3002 has the two sampled pixels in the first row covered, as does the lower right primary pixel 3002. The lower right primary pixel 3002 also has the two sampled pixels in the first column covered.

Figure 31:
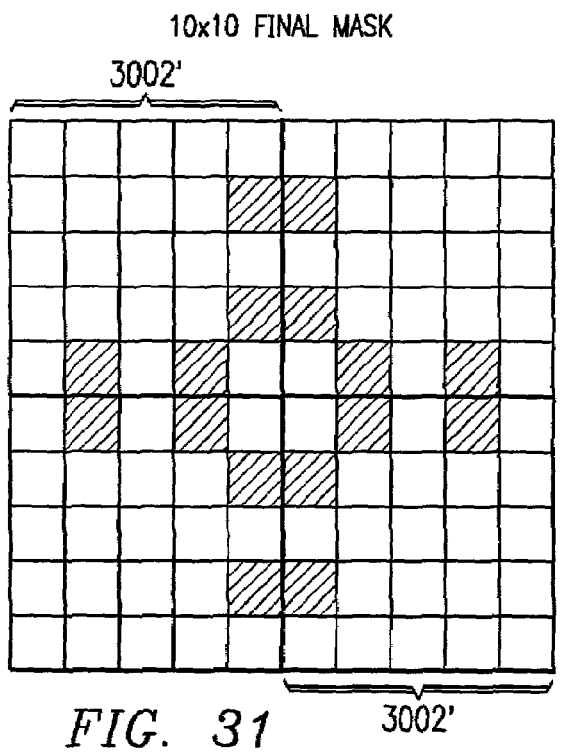
FIG. 31 illustrates the final antialiasing mask with overlapping pixels.

Referring now to FIG. 31, there is illustrated the final 5×5 AA mask, which results from the 9×9 rasterizer mask, comprised of four primary pixels 3002 and associated 4×4 AA masks, being masked into a 10×10 final mask comprised of four primary pixels 3002' and associated 5×5 AA masks. In order to provide the last column of the AA mask for the upper left 3002', the first column of the primary pixel 3002 and associated AA mask is reproduced or copied, i.e., it is overlapping. Similarly, an additional row is provided for the AA mask of the upper left 3002' by copying the first row of the AA mask of the lower left primary pixel 3002 in FIG. 30. This will be the same for the AA mask of the upper right pixel 3002', wherein the first row of the AA mask of the lower right primary pixel 3002 is copied from the rasterizer mask of FIG. 30. Also, an additional last column is provided for the AA mask of the lower left pixel 3002' by copying the first column of the AA mask of the primary pixel 3002. Therefore, the operation involves extending the number of columns by one and the number of rows by one by copying the respective column and row of the AA masks of the two adjacent pixels on the right and bottom, respectively, in addition to copying the AA masks of the upper left pixel in the lower right corner subpixel of the AA mask of the primary pixel 3002. In practice, this means that, for a 2×2 pixel packet (primary pixels), the rasterizer can generate a 9×9 subpixel coverage mask and extract row/column samples from 0-to-4 for the first pixel coverage mask, and then samples from 4-to-8 for a second pixel coverage mask. The purpose of providing this overlapping sample is to provide some additional smoothness to the image. However, it should be understood that the initial subpixel ray could be a 5×5 array.

Figure 32:
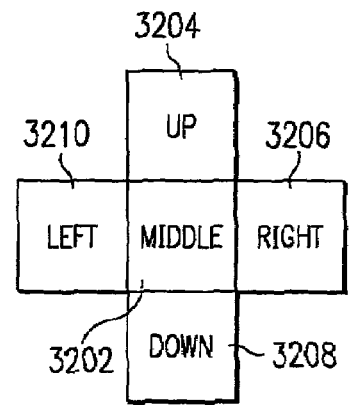
FIG. 32 illustrates the filter kernel for blending with a given pixel.

Referring now to FIG. 32, there is illustrated a diagrammatic view of a 5 tap filter kernel. In this kernel, there is provided a middle pixel 3202, which middle pixel comprises the given pixel that is being filtered or antialiased. There is provided an upper pixel 3204 adjacent the upper edge of the pixel 3202, a right pixel 3206, adjacent the right edge of the pixel 3202, a down pixel 3208, adjacent the lower edge of the pixel 3202 and a left pixel 3210 adjacent the left edge of the middle pixel 3202. Each of these pixels has associated therewith color information in the color buffer (in Back Buffer). For the blending or filtering operation, these are the five pixels that are considered. However, it should be understood that the filtering operation could be extended even further to pixels in the lower right hand corner, the upper left hand corner, the upper right hand corner, and the lower left hand corner. This filtering operation could also extend to the right of pixels 3206, below pixel 3208, leftmost of pixel 3210 and uppermost of pixel 3204. This is merely a weighting operation, as will be described hereinbelow.

Figure 33A:
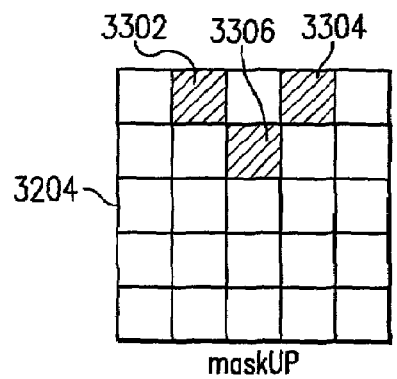
FIGS. 33a-33d illustrate the weighting operation.
Figure 33B:
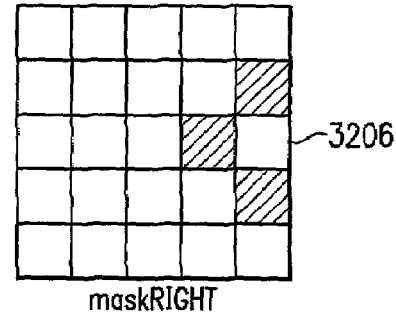
Figure 33C:
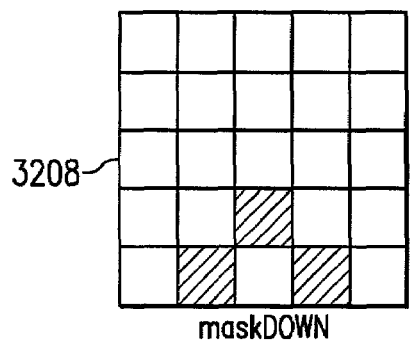
Figure 33D:
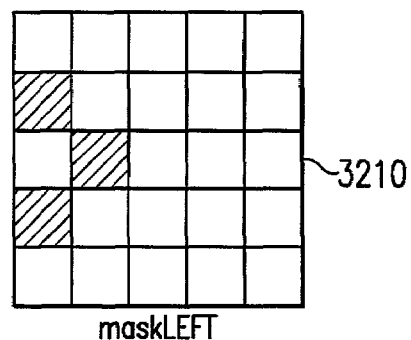

Referring now to FIGS. 33a-33d, there are illustrated four diagrams illustrating how the filtering operation is to be carried out. FIG. 33a illustrates the weighting mask associated with the up pixel 3204, FIG. 33b illustrates the weighting mask utilized for the right pixel 3206, FIG. 33c illustrates the weighting mask associated with the down pixel 3208 and FIG. 33d illustrates the weighting mask associated with the left pixel 3210. Each of the weighting masks in FIGS. 33a-33d provides only three weighting sampled subpixels that are adjacent to the edge associated with the corresponding up, right, down or left pixels that will be considered during the blending operation. In FIG. 33a, the weighting mask associated with the up pixel 3204 has the weighting sampled subpixels on the upper edge thereof indicated as being associated with the filtering operation; that is, only these subpixels will be used in the weighting operation. These are indicated as being weighting subpixels 3302, 3306 and 3304. Similarly, in the mask of FIG. 33b, it is the three sub weighting pixels corresponding to pixels 3302-3304 on the right edge that will be used in the filtering operation to blend color from the right pixel 3206 into the middle pixel 3202. In FIG. 33c, associated with the down pixel 3208, only the bottom three corresponding subpixels associated with the lower edge will be considered as weighting subpixels. In FIG. 33d, associated with the left pixel 3210, only the three subpixels proximate to the left edge of the mask will be utilized as the weighting subpixels. In FIGS. 33a-33d, the subpixels considered as weighting subpixels are indicated in dark colors. It can be seen that the filtering operation is such that it only considers the values of the subpixels in the AA mask of the middle pixel 3202 that are proximate to the adjacent pixel as weighting subpixels for that adjacent subpixel in the filtering or blending operation. This recognizes that subpixels that are distal to that adjacent pixel will not be considered as weighting subpixels, such that the filtering operation can be directionally oriented.

Since there are four adjacent pixels that are considered in the filtering operation, the AA subpixel mask for the center pixel 3202 is divided by a factor of 4, resulting in three weighting pixels associated with each of the adjacent pixels. Additionally, as will be described hereinbelow, this will result in only a 25% weighting factor for each of the overall adjacent pixels. Further, as will be described hereinbelow, the overall weighting operation is configured, such that the center pixel will be weighted by a value of 50% based upon the AA mask therein with color blended from all the adjacent pixels providing the remaining 50% of the weighting factor.

The following sequence of instructions illustrates the filtering operation:

```
//U8 = Unsigned 8bit integer value
Ccolor result, middle, up, right, down, left;
mask = maskbuf[X][Y]; // U12
middle = (Ccolor) cbuf [X][Y] * (bits (~mask));       // U8*U4
up = (Ccolor) cbuf [X][Y-1] * (bits (mask & maskUp));       // U8*U2
right = (Ccolor) cbuf [X+1][Y] * (bits (mask & maskRIGHT));
// U8*U2
down = (Ccolor) cbuf [X][Y+1] * (bits (mask & maskDOWN));
// U8*U2
left = (Ccolor) cbuf [X-1][X] * (bits (mask & maskLEFT));   // U8*U2
result = (middle+up+right+down+left) /12;
```

In this sequence of instructions, it can be seen that the middle pixel is weighted by the number of bits that are not a value of "1" in the AA mask associated therewith, up to 12, which is multiplied by the color of the middle pixel. Since there are 12 bits, this could have a maximum value of 12. In the up pixel, the number of bits that are a value of "1" in the three considered pixels is determined, this being a maximum of 3. This is multiplied by the color of the up pixel 3204. Similarly, the right weighting value, left weighting value and down weighting value are determined in a similar manner. Each of these right, left, down and up values can have a maximum value of 3, depending upon the value of the bits in the respective three adjacent weighting subpixels in the AA mask for the center or middle pixel 3202. The result of this is then the sum of these results which is divided by a factor of 12. In an example of this operation, consider that all of the bits in the pixel were turned on, this being a situation that typically would not occur. The contribution of this color to the averaging operation would then be "0," as none of the bits are indicated as not being a "1" value. The remaining four values will have a value of 3 times the pixel color for a value of 4 for each of the up, right, down and left weighting values. This will be a total of 12 which, when divided by 12, will result in the value of "1." This indicates that the pixel is the average of the four adjacent pixels.

Figure 34:
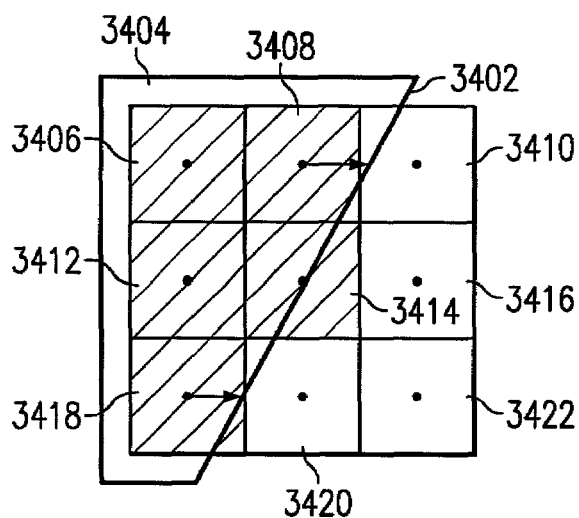
FIGS. 34, 35 and 36 illustrate diagrammatic views for an alternate embodiment utilizing distance for the anti-aliasing method.

Referring now to FIG. 34, there is illustrated a diagrammatic view of an alternate embodiment for defining the anti-aliasing (AA) value in the anti-aliasing buffer. As described above with reference to FIGS. 4-14, there was disclosed the use of a vector that changed directions, depending upon whether the pixel was outside or inside the triangle and had a magnitude that defined the amount of color that was to be blended with another and adjacent pixel. The method disclosed hereinabove utilized an anti-aliasing mask plus a second Z-value stored in each of the pixels for use when the pixel was outside of the foreground triangle. This alternate embodiment utilizes a single vector value that has both a direction and a magnitude, which is used to either push color from the edge pixel within the triangle to a pixel that lies outside the edge or to pull color from an outside pixel into the edge pixel within the triangle. The outside pixel is a pixel that is defined as being adjacent or overlapping the edge of the triangle, as will be described in more detail hereinbelow.

With further reference to FIG. 34, there is illustrated a plurality of pixels, all being proximate to an edge 3402 in a triangle 3404. In this instantiation, the sampling point of the pixels will be at the center of the pixel, this being referred to as a "center point" or "CP." However, it should be understood that a TLC (or other location) sampling point could equally as well be utilized. Within the triangle 3404, there are provided a number of pixels. For this example, an array of 3×3 pixels is illustrated, the top left pixel being a pixel 3406, with pixels 3408 and 3410 being two adjacent center and rightmost pixels, respectively, in the top row, the second row comprised of a leftmost pixel 3412, a center pixel 3414 and a rightmost pixel 3416. The bottom row is comprised of a leftmost pixel 3418, a center pixel 3420 and a rightmost pixel 3422. The triangle edge 3402 passes through pixels 3410, 3414, 3408, 3420 and 3418, in this example. Only the pixels 3406 and 3412 are totally within the triangle, whereas the pixels 3416 and 3422 are entirely outside of the triangle the remaining triangles 3410, 3414 and 3418 only partially within the triangle. However, it is not the amount of pixel that is inside of or outside of the triangle but, rather, it is the location of the center point (CP) that defines a pixel as being within the triangle 3404.

In the illustration of FIG. 34, it can be seen that the center point (CP) of pixels 3406, 3408, 3412, 3414 and 3418 are within the triangle 3404. As such, these will be rendered utilizing the color of the triangle, whereas the remaining pixels, pixels 3410, 3416, 3420 and 3422 will be rendered with background color. Further, a convention is utilized in this embodiment that defines the pixel as being a "edge" pixel if the CP of that pixel is within a width of a pixel to the edge. The distance from the CP of pixel is measured with respect to each edge of the triangle 3404 along either the x- or the y-axis (only the x-axis shown in this illustration) to determine if it is equal to or less than the normalized pixel width. If greater than the width of pixel, the value for that edge is set to "0" as to the magnitude of direction. It can be seen that pixels 3406 and 3412 have the CPs thereof disposed more than one pixel width from the edge 3402 (only the edge 3402 is considered in this example for simplicity purposes). However, the pixels 3408, 3414 and 3418 are all defined as edge pixels, since their CP is less than one pixel width from the edge 3402 along the x-axis. Each of the pixels that is defined as an edge pixel will have stored in association therewith the magnitude of this vector and the direction thereof (direction either right, left, up or down), noting the direction is always directed outward from the CP. This will constitute a 4-bit word. There will be provided 32 bits of space within the AA buffer for all three edges, such that each vector has a 4-bit value for the magnitude and a 4-bit value for the direction although this bit length is any length.

Figure 35:
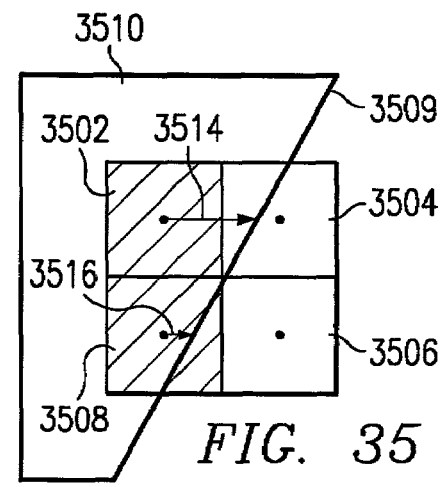

Referring now to FIG. 35, there is illustrated an alternate embodiment illustrating four pixels in a 2×2 array with an upper left pixel 3502, an upper right pixel 3504, a lower right pixel 3506 and a lower left pixel 3508. The array 3504 is disposed on an edge 3509 of a triangle 3510. The pixels are arranged such that the CP of pixels 3502 and 3508 are disposed within the triangle 3510 and the CP of pixels 3504 and 3506 are disposed outside of the triangle 3510. Therefore, pixel 3502 will have a vector 3514 associated therewith and pixel 3508 will have a vector 3516 associated therewith. The pixels are oriented such that the distance from the CP of pixel 3502 to the edge 3509 is greater than a 0.5 pixel width and the CP of pixel 3508 is disposed less than a 0.5 pixel width. As will be described hereinbelow, this will result in a blending operation wherein color from pixel 3502 will be "pulled" to pixel 3504 and possibly from pixel 3506 and color will be "pushed" from pixel 3508 to pixel 3506 and possibly to pixel 3504.

Figure 36:
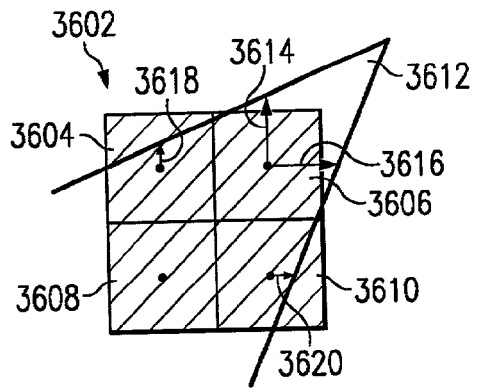

Referring now to FIG. 36, there is illustrated a diagrammatic view of a 2×2 pixel array 3602 having four pixels disposed therein, an upper left pixel 3604, and upper right pixel 3606, a lower left pixel 3608 and a lower right pixel 3610. The CPs for each of the pixels 3604-3610 are disposed within a triangle 3612, such that each has associated therewith the color of the triangle 3612. It is noted that the pixel 3608 has the CP thereof disposed more than one pixel width from any of the edges of the triangle 3612. Therefore, this pixel 3608 will have the AA values for the two edges illustrated as being a "0" value (noting that the third edge is not discussed in this example). The two edges of the triangle 3612 illustrated pass through the pixel 3606, whereas only one edge passes through pixel 3604 and only one edge passes through pixel 3610. Pixel 3606 has the CP thereof disposed such that it is less than one normalized pixel width from the first and second edges of the triangle 3612 and, therefore, will have a first distance vector 3614 disposed between the CP and the first edge of the triangle 3612 and a second distance vector 3616 disposed between the CP of pixel 3606 and the second edge of the triangle 3612 along the x-axis. The pixel 3604 will only have a single distance vector 3618 disposed between the CP thereof and the first edge of triangle 3612 along the y-axis. Similarly, the pixel 3610 will have only one distance vector 3620 disposed between the CP thereof and the second edge of the triangle 3612 along the x-axis. It could even be envisioned that a single pixel could have all three edges of a triangle disposed within one normalized pixel width. As noted hereinabove, each pixel has associated therewith an AA register in the AA buffer that provides for magnitude and direction of a distance vector for all three edges of the triangle. If the CP of the pixel is disposed from any one of the edges by more than one normalized pixel width, then this value will be set to "0."

In order to determine the distance for each edge pixel, a review of the rendering operation of pixels within a triangle is useful. In general, the basic building blocks or "primitives" for drawing or rendering complex images or polygons, triangles being the most common basic primitive, due to the fact that the triangle is the simplest polygon. The process of rendering this triangle, i.e., defined in which pixels are associated therewith, is referred to as "rasterization." This rasterization process generally involves stepping from pixel to pixel to determine whether or not to "render" (i.e., draw into a frame buffer or pixel map) each pixel as part of the triangle. During this rasterization process, information is also determined as to whether the pixel is an "edge" pixel and what the distance value thereof is, in the present embodiment.

The rasterization systems sometimes represent a triangle as a set of three edge-functions. An Edge Function is a linear equation representing a straight line, which serves to subdivide a two-dimensional plane. Edge functions classify which point within the plane as falling into one of three regions: the region to the "left" of the line, the region to the "right" of the line, or the region representing the line itself.

Figure 37:
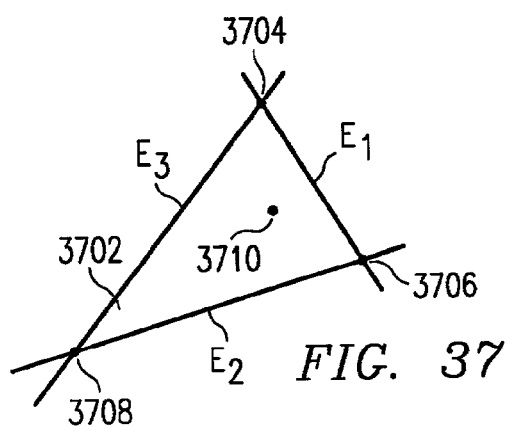
FIG. 37 illustrates a diagrammatic view of a triangle and the Edge Functions associated with each of the edges thereof.

Referring now to FIG. 37, there is illustrated a diagrammatic view of three lines intersecting to form a triangle 3702. There are provided three edges defined by Edge Functions $E_1$, $E_2$ and $E_3$, respectively. The triangle is defined by three vertices, vertex 3704 for $v_1=(x_1, y_1)$, vertex 3706 for $v_2=(x_2, y_2)$ and vertex 3708 for $v_3=(x_3, y_3)$. The Edge Functions $E_1$, $E_2$ and $E_3$ are defined by selecting the vertex that has the highest y-axis value, i.e., the highest vertex and then numbering the edges in a clockwise manner, with the Edge Functions directed from $v_1$ to $v_2$ to $v_3$ in that order. Therefore, a pixel 3710 is defined as being within the triangle if and only if Edge Function $E_1$ is positive, which is the case only if pixel 3710 lies on the right side of the line associated with $E_1$, Edge Function $E_2$ is positive, which is the case if pixel 3710 lies on the right side of the line associated with $E_2$ and Edge Function $E_3$ is positive, which is the case if pixel 3710 lies on the right side of the line associated with $E_3$. As long as all three of these conditions exist, pixel 3710 will then have been determined to be within the triangle. Therefore, pixel 3710 must be evaluated with respect to each function.

In the present embodiment, the Edge Function that is defined for each triangle relative to the x-y coordinate axis is as follows:

$$E = Ax + By + C$$

where: $A = y_1 - y_2$; and
$B = x_2 - x_1$

For a point lying on the line, E=0 and for the point $(x_1, y_1)$, the following relationship for C will be true:

$$Ax + By + C = 0$$
$$C = -Ax - By$$
$$C = x_1 y_2 - x_2 y_1$$

With these relationships, for a point off of the edge, the Edge Function will be either positive or negative and all that is required is to test that all of the three Edge Functions are positive. For the calculation, it is only necessary for each edge to calculate the values of A, B and C and then evaluate the pixels to determine if they are within the triangle.

The process for rendering a given triangle to determine which pixels are to be included within the triangle requires that the CP of each pixel is processed through the associated Edge Function for each edge. An artifact of this calculation is the fact that the distance to the edge has been calculated. To determine the distance along the x direction, it is only necessary to divide the Edge Function by the value A for the x-term and, to determine the distance along the y-axis, it is only necessary to divide the Edge Function by the value B for the y-term. Distance along either axis therefore requires only one additional computation. This is to be compared with other antialiasing methods which require generation of super samples to determine partial coverage of a pixel. As will be described hereinbelow, only the distance vector along one axis will be stored in the AA Buffer. This will be for the axis having the larger of the A- or B-values.

Figure 38:
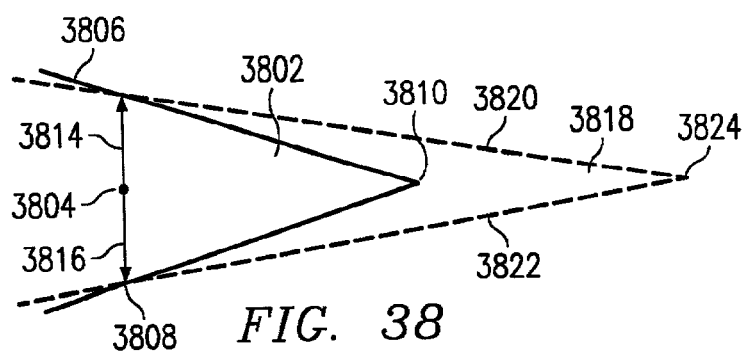
FIG. 38 illustrates a diagrammatic view of the distance vector for two different triangles with overlapping distances.

Referring now to FIG. 38, there is illustrated a diagram wherein a triangle 3802 is illustrated having a pixel CP 3804 disposed proximate to an edge 3806 and an edge 3808 coming together at a vertex 3810. The pixel CP 3804 has a distance vector 3814 disposed between CP 3804 along the y-axis to the edge 3806 and a distance vector 3816 disposed between the CP 3804 and the edge 3808. For illustrative purposes, a second triangle 3818 is illustrated having an edge 3820 and an edge 3822 joined at a vertex 3824. This triangle 3818 and the edges 3820 and 3822 are oriented such that they intersect with the edges 3808 and 3806 and pixel CP 3804 falls within triangle 3818 but has the identical distance vectors. It, therefore, can be seen that two different triangles could be configured such that they would have the same distance vectors. The reason for this is that the distance vector is normalized along the x- or y-axis. However, it should be understood that all of the information is present to provide the absolute direction of the distance vector with the x- and y-information.

Figure 39A:
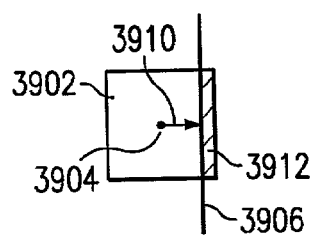
FIGS. 39a and 39b illustrate diagrams of two manners to overlap with the same distance vector.
Figure 39B:
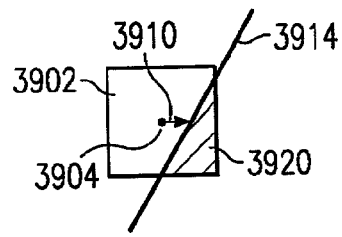

Referring now to FIGS. 39A and 39B, there are illustrated two different coverages for a common distance vector. A pixel 3902 is illustrated having a CP 3904. In FIG. 39A, a vertical edge 3906 is illustrated being disposed between the rightmost edge of the pixel 3902 and the CP 3904 and parallel to the vertical edge thereof. It can be seen that a distance vector 3910 will be less than 0.5 pixel width resulting in a portion 3912 that is not covered by the triangle associated with edge 3906 (this triangle being to the left of edge 3906) such that the portion 3912 extends over the edge. It is easy to calculate from the distance vector 3910 exactly the area of portion 3912. However, if a triangle is provided such that a triangle edge 3914 is disposed across pixel 3902 at an angle thereto, with the distance vector 3910 being identical for both the edge 3914 and edge 3906, it can be seen that there will be a different portion 3920 of the pixel 3902 that extends beyond the edge 3914 (it being noted that the triangle is disposed to the left of edge 3914). Even though the distance vector 3910 is the same for both the configuration of FIG. 39A and the configuration of FIG. 39B, the distance vector 3910 does not represent the orientation of the edge and, as such, there will be some error associated therewith, but this error can be tolerated. Alternatively, of course, the distance vector could be calculated utilizing both x- and y-values for the distance or super samples and the such, as described hereinabove, to provide multiple degrees of freedom with respect to the orientation such that multiple directions could be determined. However, this particular embodiment utilizes only the distance vector in one of four directions.

Figure 40:
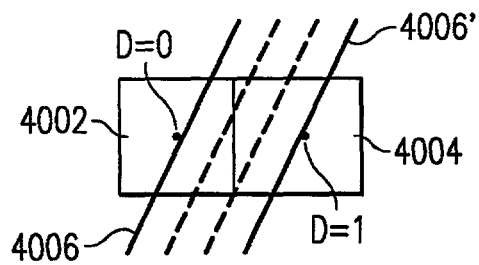
FIG. 40 illustrates a diagram of the distance value as the edge moves away from the CP of the edge pixel.

Referring now to FIG. 40, there is illustrated an alternate embodiment in an alternate illustration illustrating two adjacent pixels 4002 and 4004, with the CP of pixel 4002 being inside of the triangle, wherein an edge 4006 of the triangle is illustrated in a position proximate to the CP of pixel 4002 at a distance of approximately "0," with this edge 4006 moved to the right to a position proximate to the CP of pixel 4004 as an edge 4006' representing a distance of one pixel width from the CP 4002 and almost disposed over the CP of pixel 4004. This is disposed at an angle for illustrative purposes.

Figure 41:
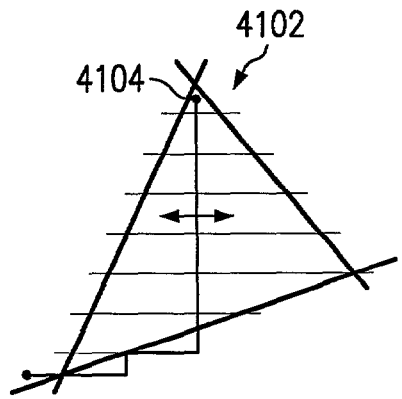
FIG. 41 illustrates a diagram of the scan algorithm.

Referring now to FIG. 41, there is illustrated a diagrammatic view of a traversal function utilized in traversing a given triangle. After the parameters of the triangle have been determined, the traversal operation is initiated at one pixel, typically on one of the vertices. In this illustration, a triangle 4102 is traversed from a starting point 4104 at the uppermost vertex and the first pixel. This first pixel is evaluated and, if it is found to be "within" the triangle (the CP is disposed within the triangle), then the algorithm will step to the right until an edge pixel is found and back to the left until an edge pixel is found. The algorithm will then increment downward from the initial pixel along the y-axis and again sample the center point and then step to the right until an edge pixel is encountered and then to the left until an edge pixel is encountered. This will continue until the entire triangle is covered. This algorithm has the advantage of never having to search for an edge and then double back. Of course, the interpolater state for the centerline must be saved while traversing the outer points, since the interpolaters must be restarted back at the centerline.

Figure 42:
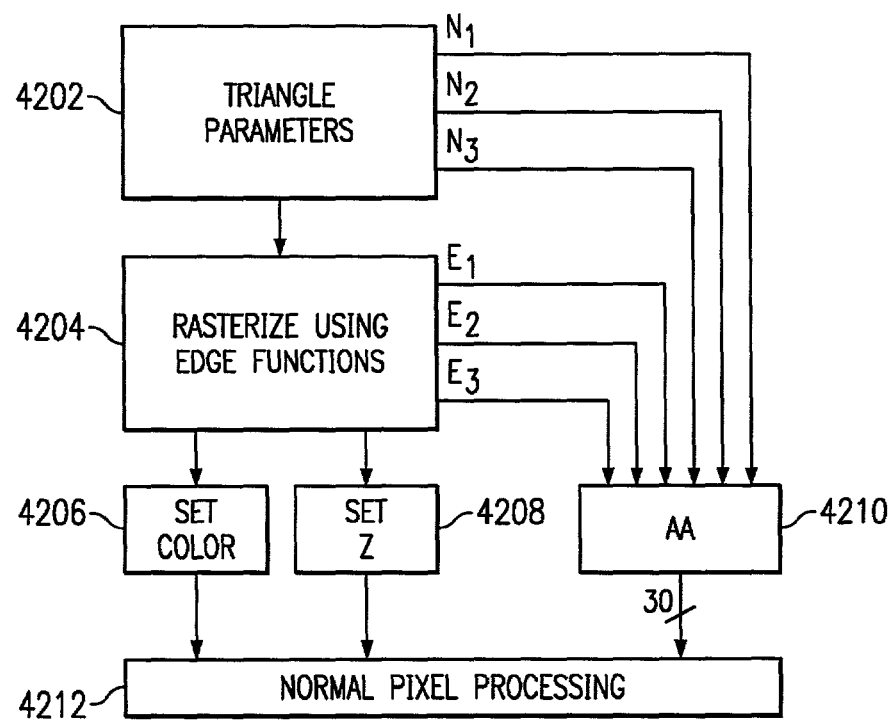
FIG. 42 illustrates a block diagram of the rendering engine.

Referring now to FIG. 42, there is illustrated a block diagram for the rendering operation which is utilized to rasterize the pixels in the frame buffer. This block diagram can be implemented in hardware or software. The rendering operation initially involves receipt of the triangle parameters, as indicated in a block 4202. These triangle parameters provide basically the x, y vertices of a particular triangle, it being noted that other polygons could be utilized in more complex systems. The triangle parameters are received and then the A, B and C values for the Edge Functions calculated, this information then transformed to a rasterizer 4202 to perform the triangle scan conversion. As noted hereinabove, the triangle scan conversion algorithm utilized involves processing each of the pixels through each of the three Edge Functions and then a determination made as to whether the pixel is in the triangle. By representing each of the triangle edges with a linear Edge Function, the rasterizer 4204 need only to determine if all of the Edge Functions are positive to determine if a particular pixel falls within a triangle and, if one Edge Function is negative, then the pixel falls outside the triangle. This is relatively conventional and well known.

Once the pixel is determined to be within the triangle, the normal process would be to define the color primitive for that pixel, as noted in a block 4206, and set the depth or z-value 4208. However, as will be noted hereinbelow, if the pixel was determined during a scan conversion of a previous triangle or polygon to be within that polygon and have a z-value that is less than the currently determined z-value, that will indicate that the pixel is in a polygon that is closer to the viewing server surface and, as such, this pixel will not be rendered in that color and the color will remain as before. It is noted that the z-value for a pixel is initially set to a value that is very large, the closer the pixel is to the surface, the smaller the z-value.

In addition to defining the color and the depth, the processing function depicted in FIG. 42 will also determine the contents of the AA buffer, in a AA block 4210. The AA block is operable to first determine a distance value and direction for pixels determined to be within the triangle and, from the determination of distance, determine if a pixel is defined as an "edge" pixel. If not an edge pixel, i.e., the distance from the center point of the pixel to any of the edges is greater than a full pixel width, then the value in the AA buffer for that one or more edges is set to zero, noting that there will be an AA value for each edge for each pixel since, as described hereinabove, the edge pixel can be an edge pixel for one edge or all three edges. Therefore, there is provided a field for the AA value for association with each of the edges.

In order to determine the distance value, all that is needed is the results of processing the coordinates of the CP for the given pixel through Edge Function for the triangle being rendered, which Edge Function inherently has as an artifact thereof distance information. However, it is not normalized. To normalize it, it is only necessary to divide the Edge Function by a normalizer for each Edge Function, which is basically the A-value (Dy) or the B-value (Dx) value, it being noted that only the largest one of the two values will be utilized, since, in this embodiment, the distance is axis aligned. These maximum values are determined in the block 4204 during set up and definition of the Edge Functions for the triangle being rendered, as they are associated with the triangle parameters. Once the Edge Function has been normalized, then a distance value is determined, i.e., Ax/A or By/B is determined. Note that only a single additional algebraic function, i.e., a division, is required over that utilized to rasterize the pixels. The distance information alone (although other information is provided) is all that is required to determine the amount of information that is "pulled" from another adjacent pixel or "pushed" to another adjacent pixel.

Each edge of the triangle for an edge pixel has provided therefor a field within the AA buffer for storage of information therein. In the disclosed embodiment, each edge has associated therewith a 10-bit value for storing the distance and direction, the direction requires only two bits, as it is either up, left, right or down and a remaining eight bits for a distance value. Once the color has been set, the z-value has been set and the AA buffer value determined, then the information is transferred to a pixel processing block 4212 to continue processing all of the pixels in a normal manner.

A set of instructions to illustrate the basic operation utilizing the Edge Functions to calculate the distance is as follows, noting that this does not take into account rasterization inclusion rules relating to for example cases where exact zeros of function results must also be considered inside the triangle for some edges:

```
// ----------------------------------------------------
//edge function is by definition zero at the vertices, so:
//   0 = A*Xv + B*Yv + C => C = -A*Xv - B*Yv
//
//Calculate function terms of all three linear edge functions
//Initialize vertices in order of: 0 -> 1 -> 2 (and back to zero)
// ----------------------------------------------------
edge0__A = Y0 - Y1;
edge0__B = X1 - X0;
edge0__C = - X0 * edge0__A - Y0 * edge0__B;
edge1__A = Y1 - Y2;
edge1__B = X2 - X1;
edge1__C = -X1 * edge1__A - Y1 * edge1__B;
edge2__A = Y2 - Y0;
edge2__B = X0 - X2;
edge2__C = -X2 * edge2__A - Y2 * edge2__B;
// ----------------------------------------------------
//Select normalizers
// ----------------------------------------------------
edge0__N = MAX(edge0__A, edge0__B);
edge1__N = MAX(edge1__A, edge1__B);
edge2__N = MAX(edge2__A, edge2__B);
// ----------------------------------------------------
//Set direction
// ----------------------------------------------------
if(edge0__A > edge0__B) edge0__DIR = horizontal;
else edge0__DIR = vertical;
if(edge1__A > edge1__B) edge1__DIR = horizontal;
else edge1__DIR = vertical;
if(edge2__A > edge2__B) edge2__DIR = horizontal;
else edge2__DIR = vertical;
// ----------------------------------------------------
//Above is executed ONLY ONCE per triangle !!!!
//as vertices (X0,Y0,X1,Y1,X2,Y2) are constant
//for one triangle
// ----------------------------------------------------
// ----------------------------------------------------
// ----------------------------------------------------
//SX,SY are screen X and Y currently under evaluation
//Evaluate the edge functions for all the pixels defined
//by rectangle (0,0)-(MAXX,MAXY)
// ----------------------------------------------------
for (SY=0; SY<MAXY; SY++)
for (SX=0; SX<MAXX; SX++)
{
  //Evaluate edge functions
  f0 = SX * edge0__A + SY * edge0__B + edge0__C;
  f1 = SX * edge1__A + SY * edge1__B + edge1__C;
  f2 = SX * edge2__A + SY * edge2__B + edge2__C;
  //Only if all functions are positive, we are inside the triangle
  if((f0 > 0)&&(f1 > 0)&&(f2 > 0))
  {
    //Normalize function results for distance.
    //Distance is either horizontal or vertical depending
    //whether A or B term was selected as normalizer
    distance0 = f0 / edge0__N;
    distance1 = f1 / edge1__N;
    distance2 = f2 / edge2__N;
    //At this point we have distance and direction
    //information of all three edges for this pixel
    generate__AA__packet( ); //pack edge data to 32 bits and store
to AA buffer
    do__standard__pixelprocessing( );
  }
}
```

Figure 43:
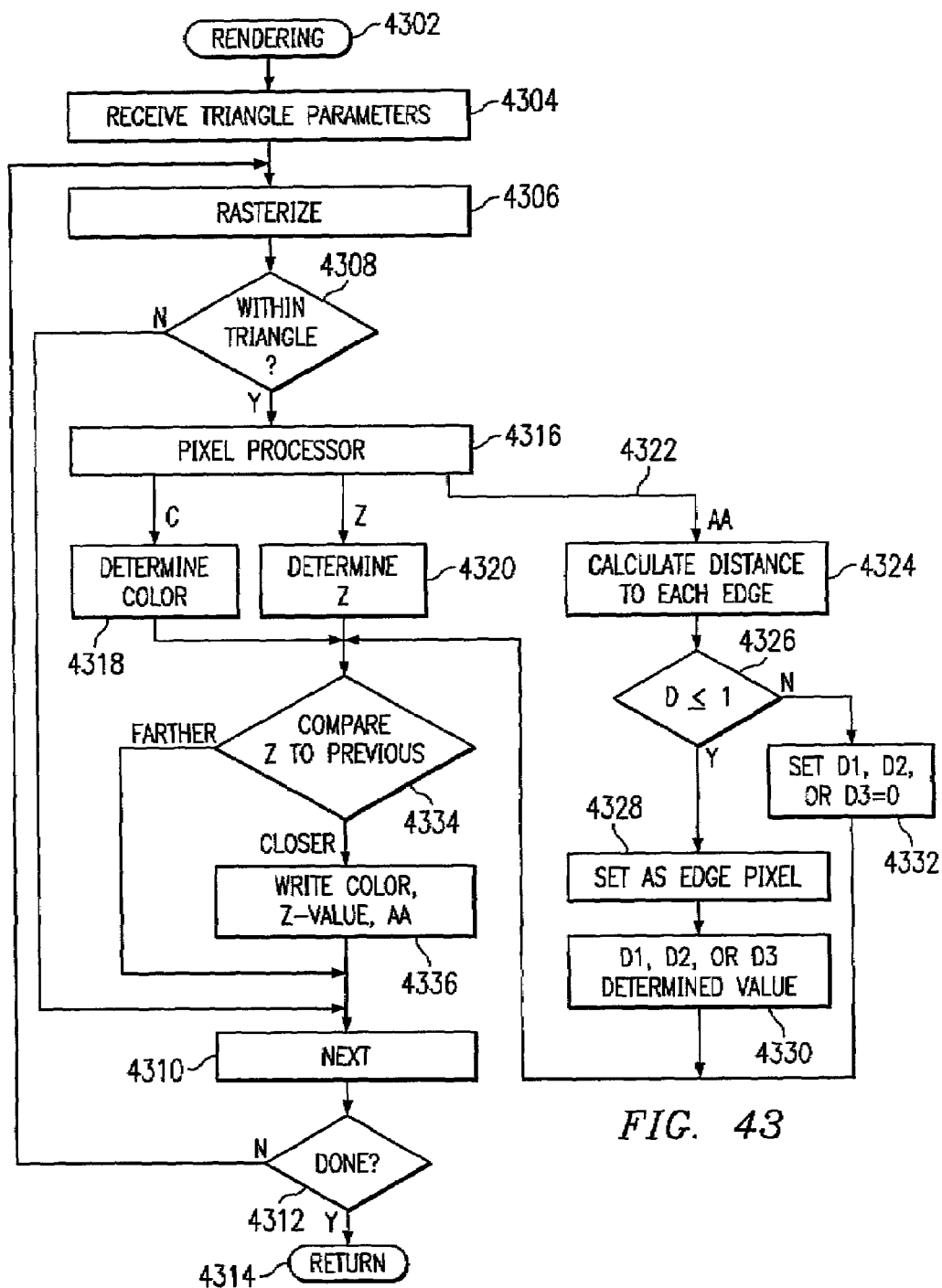
FIG. 43 illustrates a flow chart for the rendering operation.

Referring now to FIG. 43, there is illustrated a flowchart depicting the rendering operation. This is initiated at a block 4302 and the program proceeds to a function block 4304 wherein the triangle parameters are received. The program then flows to a function block 4306 to rasterize the triangle parameters which results in a scanning of the pixels within the triangles bounded by the Edge Functions. This rasterization is, therefore, facilitated utilizing the linear Edge Functions. The program then flows to a decision block 4308 to determine if the pixel is within the triangle and, if not, the program will flow to a block 4310 to select the next pixel in the scan sequence. As described hereinabove with reference to FIG. 41, this is a scan tree that increments downward through the triangle and left and right to the edge pixel at each scan line. The program then flows to a decision block 4312 to determine if the last pixel in the triangle has been scanned. This is typically done as a result of a determination that a right/left scan does not pick up any new pixels within the triangle. If complete, the program flows to a Return block 4314. If the rasterization of the pixel within the triangle has not been completed, the program will flow back to the input of the function block 4306 and continue with the rasterization operation.

When it is determined that the pixel is within the triangle, the program will flow along a "Y" path to a function block 4316 representing the operation of processing the pixels. As described hereinabove, this determines the color value, the Z value and the AA value. This will therefore provide three paths. The first path is the color path, which proceeds to a function block 4318 wherein the color is determined from the primitives and then the Z-value is determined along the Z path in a block 4320 and the AA is determined along a path 4322.

Along the path 4322, the first operation is to calculate the distance to each edge of the triangle being rendered from the CP of the pixel being processed, as indicated by function block 4324. The program then flows to decision block 4326 to determine if the distance for a given edge is less than or equal to one. If so, this defines this pixel as an edge pixel and the program flows to a function block 4328 along the "Y" path to set this as an edge pixel and then to a function block 4330 to set the determined values for D1, D2 and D3, these being the distance values for each of the edges, it being noted that only the ones of the edges having a distance less than or equal to one will be set to the determined value. If any of the distances for the three edges are greater than one, then the distance value associated with those edges will be set to a value of "0," as indicated by function block 4332 along the N path from decision block 4326. The output of function blocks 4332, 4330, 4318 and 4320 all flow to a decision block 4334 to compare the determined Z-value to the previous Z-value (which, for a pixel not previously rendered would be set to infinity) to determine if it is closer or farther from the viewing surface. If it is closer, then the program will flow to a function block 4336 to write the color, Z-value and AA values in the appropriate buffers. However, if it is farther, the program will flow around both the function block 4336, and the "Farther" path will flow to the input of the function block 4310 to select the next pixel in the scan sequence.

Figure 44:
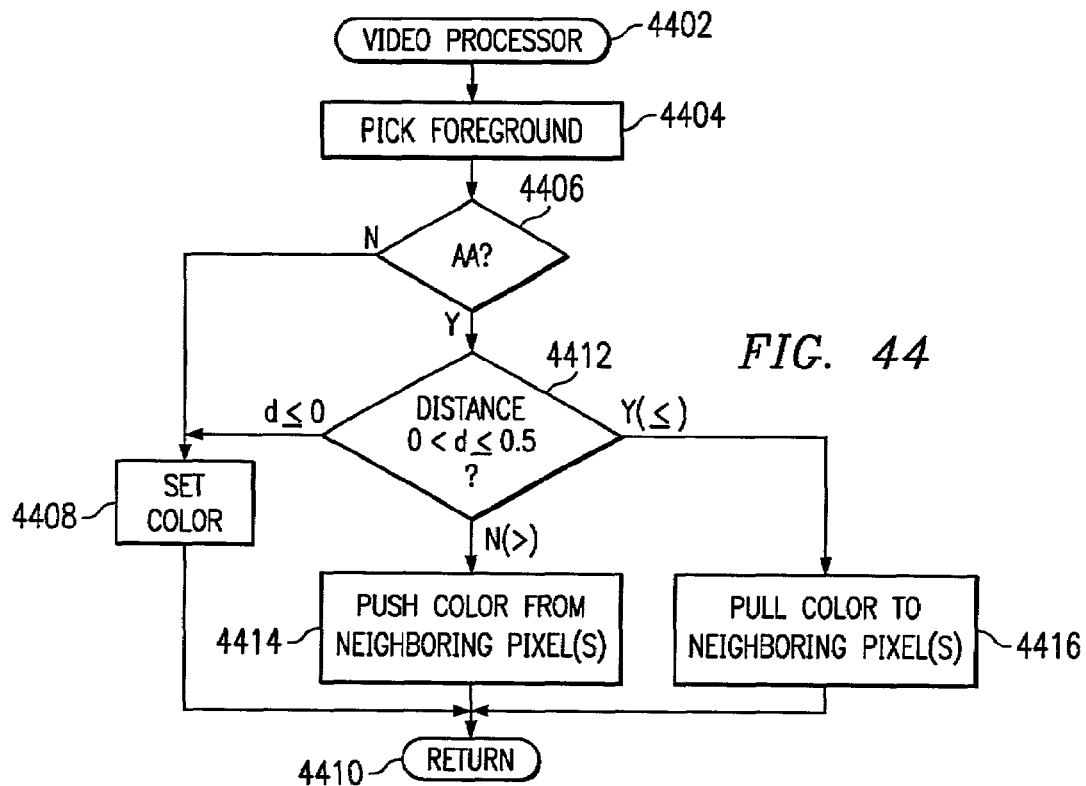
FIG. 44 illustrates a flowchart for the blending or filtering operation.

Referring now to FIG. 44, there is illustrated a flowchart depicting the operation of applying the anti-aliasing values to edge pixels in a "blending" operation. The program is initiated at a block 4402 and then proceeds to a function block 4404 wherein the pixels in the foreground are selected, these being the pixels that have the low-intensity value, i.e., they are closest to the surface. The program then flows to a decision block 4406 to determine if anti-aliasing is selected. If not, the program will flow along the "N" path to set the color of the pixel to the pixel color associated therewith, i.e., there will be no blending for that pixel, as indicated in function block 4408, and then proceeds to Return block 4410. If anti-aliasing is selected, i.e., it is turned on, then the program proceeds from the decision block 4406 along the "Y" path to a decision block 4412 wherein a determination is made as to whether the distance is less than or greater than 0.5 and greater than "0." If the distance is "0" or less than "0," the program will proceed along the "d=0" path to function block 4408. The color of the pixel will be unchanged, this not being a pixel that is blended. However, if the distance is determined to be greater than 0.5, the program will flow along the "N" path which will constitute an operation wherein color will be pulled from the adjacent pixels, as indicated by a function block 4414. However, if the distance is determined to be between 0 and 0.5, the program will flow along the "Y" to the function block 4416 wherein color will be pushed toward the adjacent pixel(s), as indicated by the function block 4416. The program will then flow to the Return block 4410 from either function block 4414 or function block 4416.

Figure 45A:
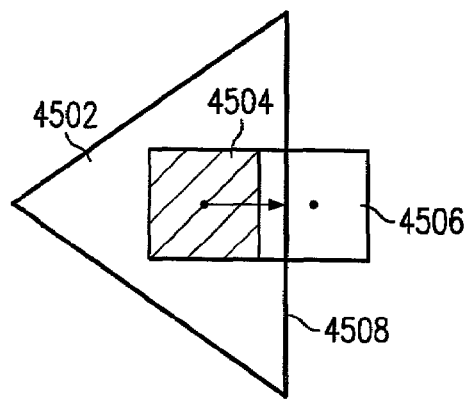
FIGS. 45A and 45B illustrate a diagrammatic view of the manner in which distance is related to pixels on the edge of a triangle.
Figure 45B:
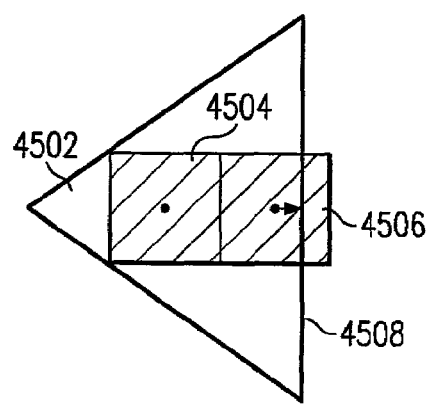

Referring now to FIGS. 45A and 45B, there are illustrated diagrammatic views of the operation showing examples where a pixel has a distance associated therewith that is less than 0.5 or greater than 0.5, respectively. In FIG. 45A, there is illustrated the triangle 4502 having disposed therein a first pixel 4504 and a second pixel 4506 adjacent thereto. The triangle 4502 has an edge 4508 disposed in a vertical direction whereas the pixels 4504 and 4506 are aligned in a horizontal orientation. The edge 4508 is disposed between the CP of pixel 4504 and the CP of pixel 4506, wherein the entire pixel 4504 is within the triangle 4502 but only a portion of the pixel 4506 is disposed within the triangle 4502. As such, the distance from the CP of pixel 4504 to the edge 4508 will be greater than 0.5, i.e., this will be defined as an edge pixel that will "pull" color from the pixel 4506 during the blending operation, it being noted that the pixel 4506 will initially be set to the background color outside of triangle 4502.

With reference to FIG. 45B, the pixels 4504 and 4506 are disposed within the triangle 4502 such that an edge 4508 is disposed to the right of the CP of pixel 4506. In this manner, the pixel 4504 is completely within the triangle 4502 and the CP of pixel 4506 is also within the triangle 4502. As such, the distance from the CP of pixel 4504 to edge 4508 is greater than one pixel width and, as such, the distance value for pixel 4504 will be set to "0" and it will no longer be classified as an edge pixel. Pixel 4506 is now the edge pixel and the distance value associated therewith will be calculated from the CP of pixel 4506. However, even though the color of pixel 4506 is set to the color of the triangle 4502, a portion of the pixel 4506 is disposed outside of the triangle 4502, i.e., it overlaps the edge 4508. As such, this edge pixel will "push" color to the neighboring pixels.

Figure 46A:
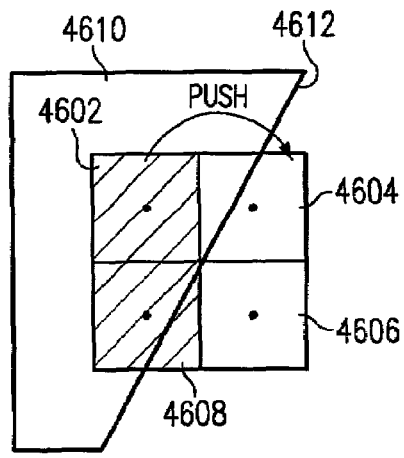
FIGS. 46A and 46B illustrate the push/pull operation, respectively.

Referring now to FIG. 46A, there is illustrated a diagrammatic view of a 2×2 array of four pixels having an upper left pixel 4602, an upper right pixel 4604, a lower right pixel 4606 and a lower left pixel 4608, disposed within a triangle 4610 on an edge and overlapping an edge 4612 thereof. The edge 4612 is disposed such that the CP of pixels 4602 and 4608 are disposed in triangle 4610. This will result in pixel 4602 having a distance that is greater than 0.5, resulting in a blending operation wherein color will be pushed from pixel 4602 over to the adjacent pixel 4604. As will be described hereinbelow, color may also be pushed to pixel 4606, but is not illustrated here for simplicity purposes. This is a function of the blending or filtering algorithm utilized and the complexity thereof.

Figure 46B:
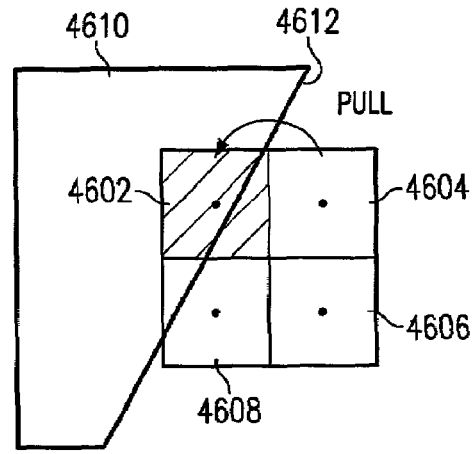

Referring now to FIG. 46B, there is illustrated an alternate embodiment wherein the array of pixels 4602-4608 is moved slightly to the right of the edge 4612 in order that only pixel 4602 has the CP thereof disposed within the triangle 4610. This will result in pixel 4602 having a distance that is less than 0.5, i.e., it will be defined as a "pull" pixel. The pull operation will result in pixel 4602 pulling color from pixel 4604. Although not illustrated, pixel 4602 could also, in the disclosed embodiment, result in pulling of color from pixel 4606 and 4608. This will be based upon a weighted average.

Figure 47:
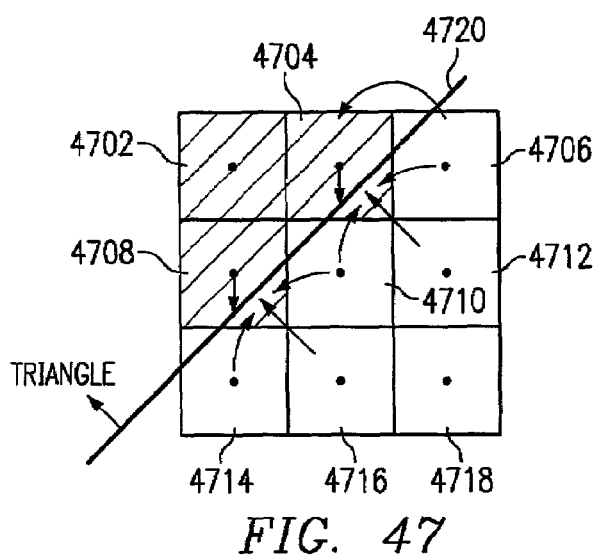
FIG. 47 illustrates a diagrammatic view of the blending operation for one embodiment.

Referring now to FIG. 47, there is illustrated an array of nine pixels arranged in a 3×3 array utilizing a more complex blending or filtering algorithm. There is provided in the first row, pixels 4702, 4704 and 4706 from left to right, respectively. In the second row, there are provided pixels 4708, 4710 and 4712. In the third row, there are provided pixels 4714, 4716 and 4718. A triangle edge 4720 is disposed through the array such that the CPs for pixels 4702, 4704 and 4708 are disposed within the triangle. As such, the color of these pixels will be set to the color of the triangle. Pixel 4704 and pixel 4708 each have a distance that is less than 0.5 aligned along the y-axis resulting in these pixels being defined as edge pixels, whereas pixel 4702 has a distance that is greater than 1.0, it not defined as an edge pixel. In this embodiment, the blending operation is such that pixel 4704, with its distance arranged along the diagonal, will "pull" color from pixels 4712, 4706 and 4710—for the\is more complex blending or filtering operation. Similarly, pixel 4708 will pull color from pixels 4710, 4714 and 4716.

For pixel 4708, a portion thereof extends over the edge 4720, but the two adjacent pixels that are not on the diagonal also overlap the edge 4720 but are set to a background color. In this operation, there would be a weighted "pull" from the pixels. One method would be to set the weighting factor such that 80% of the color would be pulled from pixel 4716, 10% from pixel 4714 and 10% from pixel 4710. If it were determined that pixel 4708 had a distance that indicated 30% of the pixel lay outside of the line 4720, then 0.8×0.3 of the color of pixel 4716 would be added to color of pixel 4708, 0.1×0.3 of the color of pixel 4710 would be added to pixel 4708 and 0.1×0.3 of the color of pixel 4714 would be added to pixel 4708 and the base color of pixel 4708 would be reduced by 0.3. This will be the same with respect to pixel 4704. Of course, these are just one set of rules and multiple rules could be utilized. Further, it should be understood that the pull could further be weighted as to distant neighbors, i.e., color could be pulled from 4718 as a weighted value such that the farther away the pixel was from the edge, the lower the weighting value would be for that pixel. This is primarily a function of the processing power that is provided.

Figure 48:
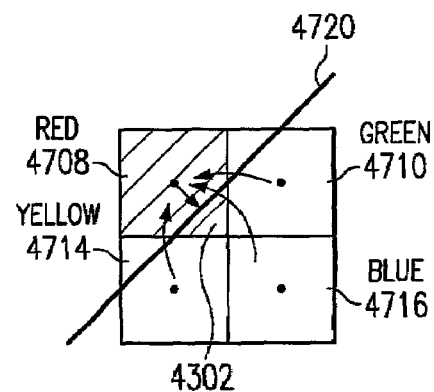
FIG. 48 illustrates a detailed view of the blending operation of FIG. 47.

Referring now to FIG. 48, there is illustrated a detail of the array in FIG. 47 detailing only the pixels 4708, 4720, 4714 and 4716. In this example, pixel 4708 is illustrated as being red, since the CP thereof is disposed within the boundaries of the triangle and, for this example, the triangle color is red. In this example, the background color of pixel 4710 is green, the background color of pixel 4716 is blue and the background color of 4714 is yellow. Since the distance from the CP of pixel 4708 to the edge 4720 of the triangle is less than 0.5 pixel width, then this will indicate this as a "pull" blending operation. The reason for this is, as can be seen from FIG. 43, a portion of the pixel 4708 overlaps or extends beyond the edge 4720. Since it extends beyond, some blending must be performed that would reduce the appearance of this protrusion. As such, a color would be pulled from the external pixels into the triangle. In this embodiment, all that is required is information within the triangle, such that information need not be stored both in a pixel within a triangle for the purpose of determining its relationship with the triangle and also information outside of the triangle such as the second Z-value. In this embodiment, all decisions are made based upon information stored within the AA buffer of pixel 4708. The percentage that is blended is a function of the super sampling operation that determined the number of pixels that are disposed outside of the edge 4720, this being represented in the magnitude of the distance vector. The direction of the distance vector determines from which external pixel color will be "pulled" (or "pushed" for the opposite operation). In this embodiment, assume that an outside portion 4302 of the pixel 4708 constitutes 30% of the pixel 4708. This would therefore require that 30% color be pulled from outside of the pixel 4708 and blended with the color of the pixel 4708. As such, the red color of pixel 4708 would be reduced to 70% thereof and the other colors blended in to fill in that 30%. In one embodiment, the 30% could be completely pulled from the pixel 4716 or, alternately, as shown in FIG. 43, it is pulled from pixel 4710, pixel 4714 and pixel 4716. As described hereinabove, a typical weighting algorithm could require 80% of the 30% to be pulled from pixel 4716, i.e., a blue color, 10% of the 30% pulled from pixel 4714 and 10% of the 30% pulled from pixel 4710, i.e., the green pixel. This is illustrated in the following Table 1.

TABLE 1

| Red Initial | Blue | Yellow | Green | Red Final |
|---|---|---|---|---|
| R = 255 | R = 0 | R = 128 | R = 0 | R = 182 |
| G = 0 | G = 0 | G = 128 | G = 255 | G = 12 |
| B = 0 | B = 255 | B = 0 | B = 0 | B = 61 |

It can be seen from the table he initial red value is 255 wherein green and blue would be "0." The red would be reduced to 70% or approximately 179. An amount of green color would be added that would constitute would have 3% pulled from the yellow pixel 4714, which would be a value of 4, since the green value is equal to 128 in pixel 4714, and would only pull 3% of a green value of 128 from green pixel 4710 for a total yellow value of 12. An amount of blue color would be added to pixel 4708 from pixel 4716, which would constitute a of pull of 24% from the blue pixel 4716, which has an initial value of 255, for a blended value of 61. In addition to pulling 3% of the green color value from the yellow pixel 4714, 3% of the red color value is pulled from the yellow pixel 4714 for a total of 182 as red color value for the pixel 4708. The final value would be R=182, G=12 and B=61, approximately. Of course, the weighting factors can vary between adjacent pixels and, as described hereinabove, the weighting factors could be such that pixels beyond the pixel 4716 along the diagonal or pixels beyond the pixels 4710 and 4714 along the horizontal or vertical, respectively, could have color pulled from them with other weighting factors applied.

Although the preferred embodiment has been described in detail, it should be understood that various changes, substitutions and alterations can be made therein without departing from the spirit and scope of the invention as defined by the appended claims.

What is claimed is:

1. A computer implemented method for anti-aliasing pixels proximate to an edge of a polygon displayed on a display, comprising the steps of:

determining if the position of a desired pixel is located within the polygon;

if determined to be within the polygon, determining if the desired pixel is proximate to at least one of the edges of the polygon and within a predetermined pixel width thereof;

determining if the position meets a first predetermined condition or a second predetermined condition;

if the position meets the first predetermined condition, then blending with the color of the desired pixel the color of at least an adjacent pixel in a first predetermined proportion and in a first predetermined direction;

if the position meets the second predetermined condition, then blending with the color of at least an adjacent pixel the color of the desired pixel in a second predetermined proportion and in a second predetermined direction; and displaying at least the desired and adjacent pixels.

2. The method of claim 1, wherein the pixel is located outwardly from the triangle relative to the desired pixel.

3. The method of claim 2, wherein the first and second predetermined portions are based on the position of the desired pixel relative to the edge of the polygon.

4. The method of claim 1, wherein the polygon is a triangle having three edges.

5. The method of claim 1, wherein each pixel has a sample point and the step of determining if a desired pixel is located within the polygon comprises determining if the sample point is located within the polygon.

6. The method of claim 5, wherein the step of determining if the position of the desired pixel is proximate to the at least one of the edges of the polygon comprises determining if the sample point is within a predetermined distance of the at least one of the edges of the polygon.

7. The method of claim 6, wherein the step of determining if the position meets a first predetermined condition comprises the step of determining if the desired pixel has a sample point thereof located within the polygon and if a portion thereof overlaps the at least one edge of the polygon.

8. The method of claim 6, wherein the step of determining if the position meets the second predetermined condition comprises determining if an adjacent pixel to the desired pixel overlaps the at least one edge of the polygon and a sample point of the adjacent pixel is not within the polygon.

9. The method of claim 6, wherein the sample point is equal to substantially the centerpoint of the pixel.

10. The method of claim 9, wherein the step of determining if the position meets a first predetermined condition comprises determining if the centerpoint of the desired pixel is disposed from the at least one edge of the polygon by a distance of at least one-half of a full pixel width and less than or equal to a full pixel width.

11. The method of claim 9, wherein the step of determining if the position meets the second predetermined condition comprises the step of determining if the centerpoint of the desired pixel has a distance from the at least one edge of the polygon of less than or equal to one-half of full pixel width.

* * * * *